United States Patent [19]

Matsumi et al.

[11] Patent Number: 5,479,299
[45] Date of Patent: Dec. 26, 1995

[54] METHOD OF TRANSMITTING DIGITAL VIDEO AND AUDIO SIGNALS BETWEEN BIT RATE REDUCTION ENCODED SIGNAL RECORDING AND REPRODUCING SYSTEMS

[75] Inventors: Chiyoko Matsumi, Suita; Takahiro Nakamura, Osaka; Susumu Yamaguchi, Moriguchi; Hideki Ohtaka, Neyagawa; Ryouichi Hoshiai, Osaka; Masakazu Nishino, Kashiwara, all of Japan

[73] Assignee: Matsushita Electric Industrial Co., Ltd., Osaka, Japan

[21] Appl. No.: 831,994

[22] Filed: Feb. 6, 1992

[30] Foreign Application Priority Data

| Feb. 7, 1991 | [JP] | Japan | 3-016190 |
| Jul. 10, 1991 | [JP] | Japan | 3-169931 |
| Aug. 21, 1991 | [JP] | Japan | 3-209225 |
| Jan. 24, 1992 | [JP] | Japan | 4-010663 |

[51] Int. Cl.$^6$ ............................................. G11B 27/02
[52] U.S. Cl. .................... 360/14.1; 360/15; 360/20; 360/33.1; 360/39; 360/48; 360/61; 358/335
[58] Field of Search ............................ 360/15, 32, 61, 360/48, 53, 13, 14.1, 14.2, 14.3, 33.1, 39, 20; 358/183, 141, 142, 143, 145, 335; 348/384, 390, 589

[56] References Cited

U.S. PATENT DOCUMENTS

| 4,210,785 | 7/1980 | Huber et al. | 360/12 |
| 5,193,010 | 3/1993 | Juri et al. | 358/336 |

FOREIGN PATENT DOCUMENTS 0415699  3/1991  European Pat. Off. .

OTHER PUBLICATIONS

10. Jahrestagung der Fktg, Tagungsband, Sep. 1982, Munchen, DE, pp. 526–548, Westerkamp et al., "Digital Magnetbandaufzeichnung von Video—und Audiosignalen auf einem Videocassettenrecorder", * p. 541, paragraph 2–p. 544, paragraph 1 * * Figure 11 *.

Eight International Conference on Video, Audio and Data Recording, Apr. 1990, Birmingham, GB, pp. 93–100, XP000218942, Sasaki et al., "½–Inch Video Cassette Recorder For Baseband HDTV", * p. 94, paragraph 7–paragraph 10 * *figures 1–4*.

SMPTE Journal, vol. 96, No. 10, Oct. 1987, Scarsdale, N.Y. US pp. 934–943, XP000001306, Engberg et al., "The Composite Digital Format and Its Applications", * p. 937, right col., paragraph 2–p. 939, middle col., paragraph 1 * * figures 1–2 * * table 2 *.

"An Experimental Study for a Home–Use Digital VTR", Yamamitsu et al., IEEE Transactions on Consumer Electronics, vol. 35, No. 3, Aug. 1989.

"Low Bit–Rate Digital Audio Coding Systems", Report 1199, 1990, pp. 241–248.

*Primary Examiner*—Andrew L. Sniezek
*Attorney, Agent, or Firm*—Wenderoth, Lind & Ponack

[57] ABSTRACT

In a digital signal recording and reproducing apparatus, a signal obtained by multiplexing an audio signal on a bit rate reduction encoded video signal is delivered as a transmission signal. The transmission signal is multiplexed with a data showing its content, such as a copy number of times data and an edit number of times data. Depending on the state of reproduction at a reproducing side apparatus, which is a source side of transmission, a control data for controlling a recording side apparatus, which is a destination of transmission is also multiplexed.

38 Claims, 17 Drawing Sheets

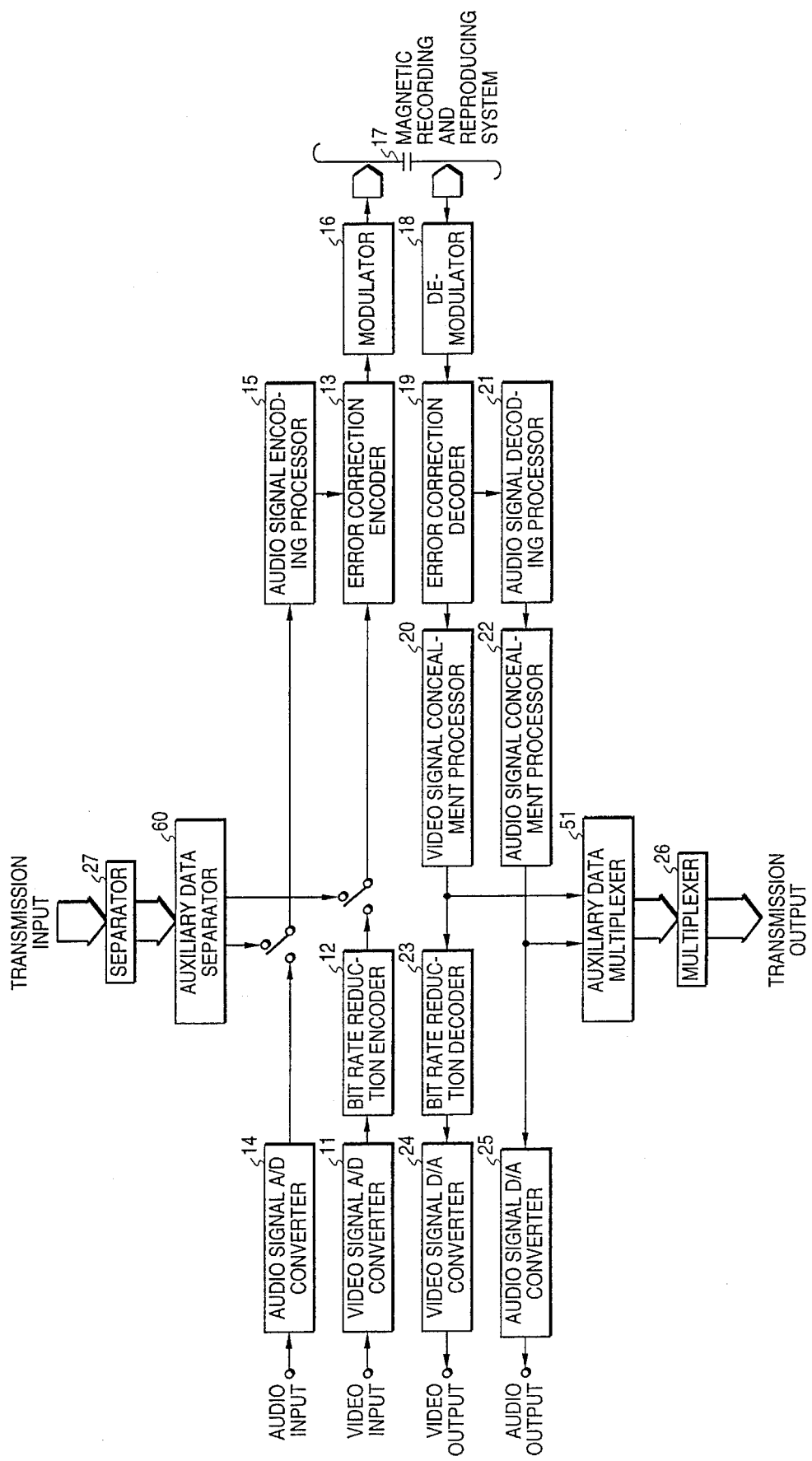

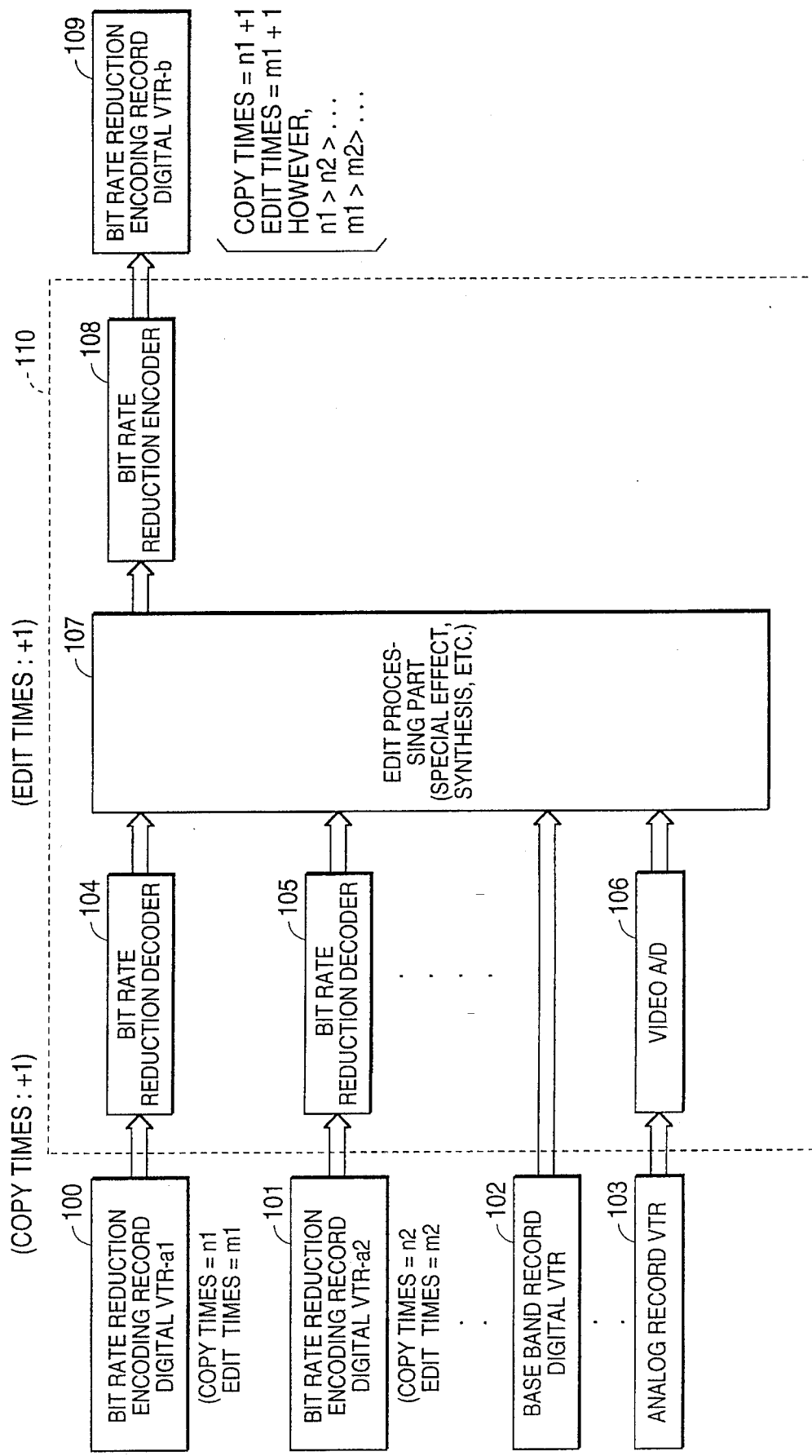

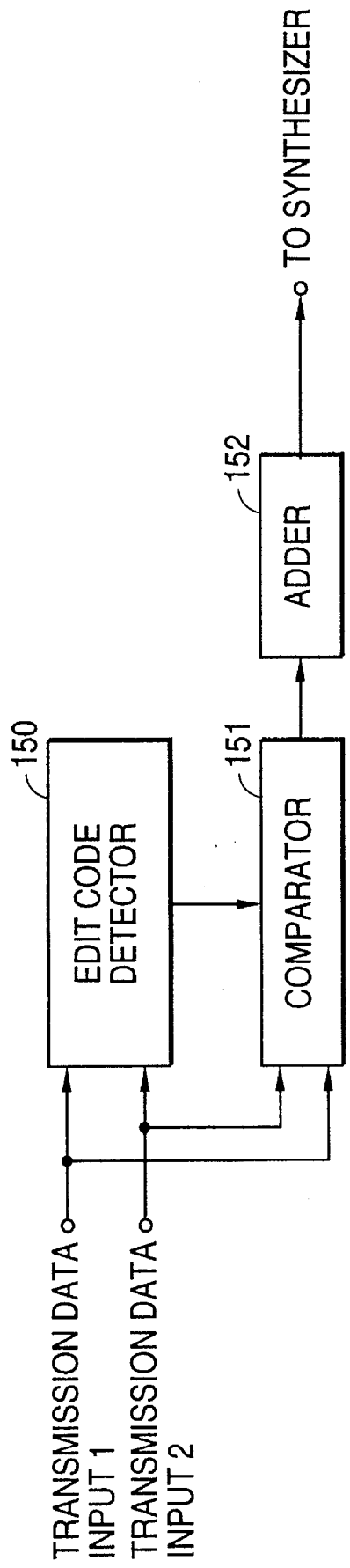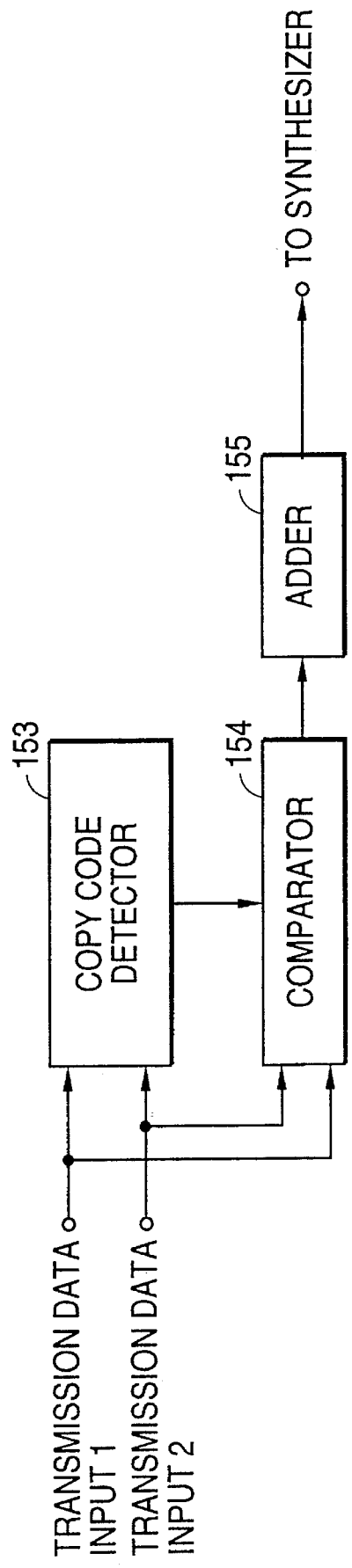

5,479,299

METHOD OF TRANSMITTING DIGITAL VIDEO AND AUDIO SIGNALS BETWEEN BIT RATE REDUCTION ENCODED SIGNAL RECORDING AND REPRODUCING SYSTEMS

BACKGROUND OF THE INVENTION

1. Field of the Invention

The present invention relates to a method of transmitting digital signals between digital video and audio signal recording and reproducing apparatuses by making use of bit rate reduction technology.

2. Description of the Prior Art

Recent dramatic advancements in the video and audio signal recording and reproducing technology make use of digital techniques, but when attempts are made to apply such technology to the home-use VTR, the most significant problem that arises is with respect to the data quantity. For example, the transmission rate of the video signal to be delivered is as high as 216 Mbps in the 4:2:2 standard, which renders direct long-time recording difficult.

Accordingly, various bit rate reduction methods have been proposed for the video signals and audio signals, and recording and reproducing apparatuses making use of bit rate reduction techniques have come to be developed.

As for bit rate reduction, for example, the video signal is realized by the discrete cosine transform proposed by C. Yamamitsu et al. in "An Experimental Study for a Home-Use Digital VTR," IEEE Trans. on Cons. Elec., Vol. 35, No. 3, pp. 450–457, Aug. 1989, and the audio signal is represented by the sub-band coding method as disclosed in "Low Bit-rate Digital Audio Coding Systems," CCIR Report 1199, 1990.

Meanwhile, as a problem associated with bit rate reduction, the issue of accumulation of distortions by recoding is known. For example, in video signals, generally the frequency components obtained by orthogonal transform of the intended signal are coded, but in the orthogonal transform and inverse orthogonal transform, rounding errors may occur in relation of the number of operation digits and number of output digits. In audio signals, a similar operation error may be anticipated.

In the conventional digital audio appliances or digital video equipment, A/D-converted audio signals or video signals are transmitted. The conventional digital signal transmitting method is explained below.

Digital signal transmission is performed between recording and reproducing apparatuses comprising a video signal A/D converter, a bit rate reduction encoder, an error correction encoder, an audio signal A/D converter, an audio signal encoding processor, a modulator, a magnetic recording and reproducing system, a demodulator, an error correction decoder, a video signal concealment processor, an audio signal decoding processor, an audio signal concealment processor, a bit rate reduction decoder, a video signal D/A converter, and an audio signal D/A converter.

The input video signal is A/D-converted by the video signal A/D converter, and is encoded by the bit rate reduction encoder, and parity symbols of error correcting codes are added in the error correction encoder. On the other hand, the input audio signal is A/D-converted by the audio signal A/D converter, and is sent into the audio signal coding processor for audio signal processing such as shuffling and error correction encoding, and is multiplexed on the video signal. The signal is then modulated in the modulator, and is recorded in the magnetic recording and reproducing system.

The data reproduced from the magnetic recording and reproducing system is demodulated in the demodulator. Errors which occurred in the magnetic recording and reproducing system are corrected in the error correction decoder, and uncorrectable errors are concealed in the video signal concealment processor. Then, bit rate reduction decoding is effected in the bit rate reduction decoder. The signal obtained at this point is used as the video signal portion of the transmission output. After demodulation, audio signal processing such as deshuffling and error correction decoding is effected in the audio signal decoding processor, and uncorrectable errors are concealed in the audio signal concealment processor. The signal obtained at this point is used as the audio signal portion of the transmission output.

In the final output, the video signal D/A-converted by the video signal D/A converter and the audio signal D/A-converted by the audio signal D/A converter are delivered.

To transmit from the reproducing side apparatus to the recording side apparatus, the outputs of the bit rate reduction decoder and the audio signal concealment processor of the reproducing side apparatus are transmitted to the recording side apparatus, and they are respectively fed into the bit rate reduction encoder and audio signal encoding processor.

In such a constitution, however, for one transmission, the number of times of orthogonal transform and inverse orthogonal transform on the original signal increases by one each, and the distortions due to orthogonal transform and inverse orthogonal transform are accumulated, and accordingly distortion due to bit rate reduction may also take place.

The transmission rate of the output video signal is, for example in the 4:2:2 standard, 216 Mbps, which means serial transmission is difficult. In parallel transmission, however, the problem arises with respect to the shape of the cable used in transmission. Still worse, since the transmission of the audio signal is not included in the standard of the video signal, more serious problems with respect to cable and transmission rate are presented.

SUMMARY OF THE INVENTION

It is hence a primary object of the invention to present a digital signal transmitting method which is free from distortion due to orthogonal transform or inverse orthogonal transform, in the transmission of digital signals between recording and reproducing apparatuses.

To achieve the above object, a digital signal transmitting method of the invention is applied in an apparatus for recording and reproducing a digital audio signal and a bit rate reduction encoded digital video signal, in which a signal obtained by multiplexing an audio signal compressed in a time axis in a data blank period of a video signal before bit rate reduction decoding is used as a digital transmission output at a reproducing side apparatus, and the above digital transmission output is used as a digital transmission input at a recording side apparatus, and the video signal and audio signal are separated.

In another aspect of the invention, reproduction processing is done in parts which are not necessary for transmission and recording to monitor the transmission signal in the recording side apparatus.

In the conventional transmitting method of digital signal recording and reproducing, every time transmission is carried out, the number of times of orthogonal transform and inverse orthogonal transform increases by one each, and the distortions of orthogonal transform and inverse orthogonal transform are accumulated. Accordingly, distortions due to bit rate reduction occur. Further, since the transmission rate of the digital signal is 200 Mbps or more, serial transmission is difficult.

By contrast, the digital signal transmitting method of the invention makes it possible to transmit signals without accumulating distortions because it is not necessary to process orthogonal transform and inverse orthogonal transform, by transmitting in the bit rate reduction encoded state as the transmission output.

BRIEF DESCRIPTION OF THE DRAWINGS

FIG. 5 is a block diagram of a fifth embodiment of the invention.

FIG. 12 is a block diagram of an editing machine in a seventh embodiment of the invention.

FIGS. 15(a) and 15(b) depict a structure of a transmission information updating device of an editing processor in the seventh embodiment of the invention.

DESCRIPTION OF THE PREFERRED EMBODIMENTS

Figure 1:
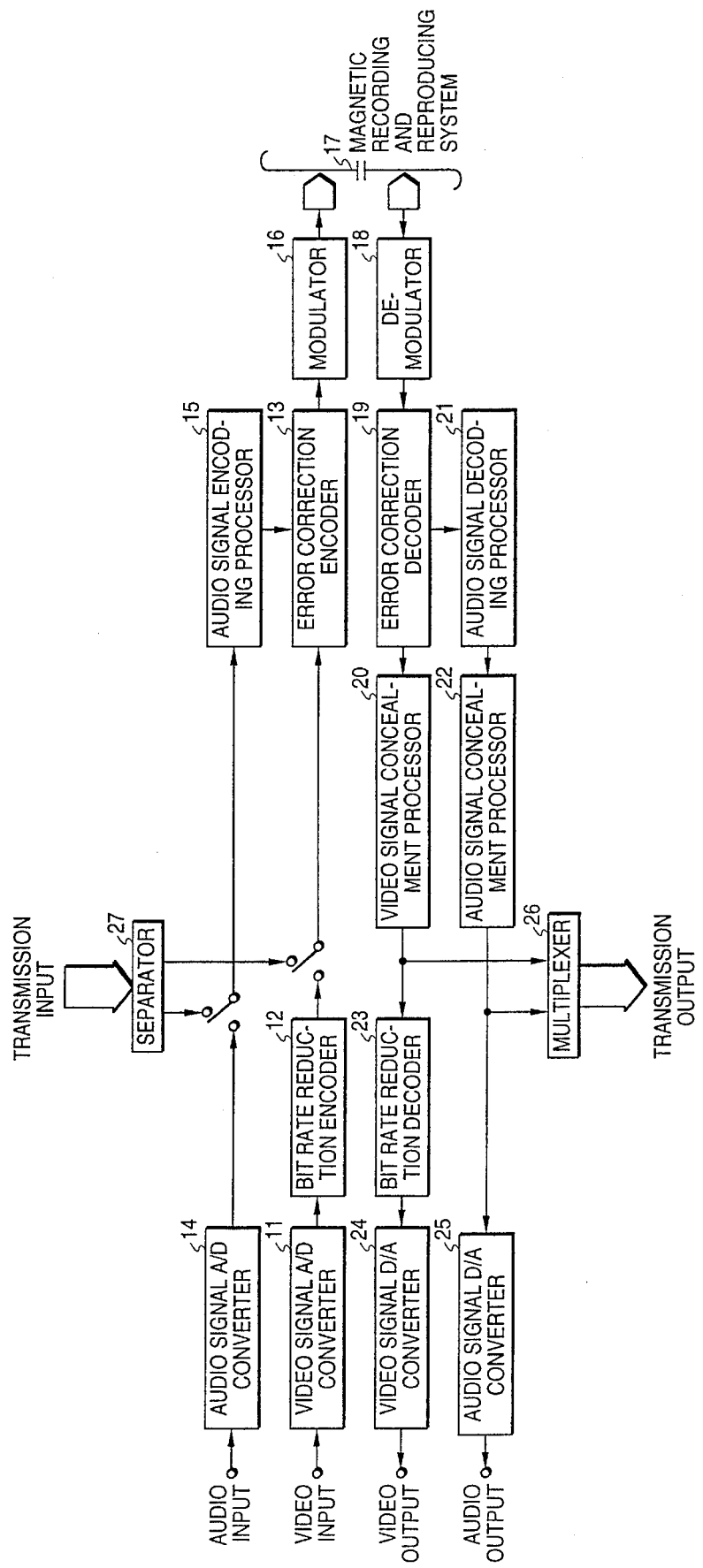
FIG. 1 is a block diagram for explaining a digital signal transmitting method in a first embodiment of the invention.

A block diagram of the digital signal transmitting method in a first embodiment of the invention is shown in FIG. 1.

The first embodiment is described below while referring to the drawing.

Numeral 11 is a video signal A/D converter, 12 is a bit rate reduction encoder, 13 is an error correction encoder, 14 is an audio signal A/D converter, 15 is an audio signal encoding processor, 16 is a modulator, 17 is a magnetic recording and reproducing system, 18 is a demodulator, 19 is an error correction decoder, 20 is a video signal concealment processor, 21 is an audio signal decoding processor, 22 is an audio signal concealment processor, 23 is a bit rate reduction decoder, 24 is a video signal D/A converter, 25 is an audio signal D/A converter, 26 is a multiplexer, and 27 is a separator.

In the thus composed recording and reproducing apparatus of digital signals, the input video signal is A/D-converted in the video signal A/D converter 11, and bit rate reduction encoded in the bit rate reduction encoder 12, and parity symbols of error correcting codes are added in the error correction encoder 13. The input audio signal is A/D-converted in the audio signal A/D converter 14, and subjected to audio signal processing such as shuffling and error correction encoding in the audio signal coding processor 15, and it is multiplexed with the video signal from the error correction encoder 13. (In this embodiment, the audio signal is not subjected to bit rate reduction encoding, but the processings are the same when the audio signal is bit rate reduction encoded.) If the error correction code of the audio signal is common with a part or whole of the error correction code of the video signal, the error correction encoding processing of the audio signal of the common portion may be effected in the error correction encoder 13. The signal is then modulated in the modulator 16, and is recorded in the magnetic recording and reproducing system 17.

The data reproduced from the magnetic recording and reproducing system 17 is demodulated in the demodulator 18, and the video data portion thereof is corrected in the error correction decoder 19, and uncorrectable errors are concealed in the video signal concealment processor 20. The signal obtained at this point is used as the video signal portion of the transmission output. The audio data portion of the demodulated data is fed into the audio signal decoding processor 21 for audio signal processing such as error correction decoding and de-shuffling, and uncorrectable errors are concealed in the audio signal concealment processor 22. The signal obtained at this point is used as the audio signal portion of the transmission output. If the error correction decoding method of the audio signal is common with a part or the whole of the error correction decoding method of the video signal, the error correction decoding process of the audio signal of the common portion may be effected in the error correction decoder 19.

In the final output, the video signal decoded in the bit rate reduction decoder 23 and D/A-converted in the video signal D/A converter 24, and the audio signal D/A-converted in the audio signal D/A converter 25 are delivered. The multiplexer 26 delivers the signal multiplexed on the time axis of the output from the video signal concealment processor 20 and the output from the audio signal concealment processor 22 as the transmission output. The output signal from the video signal concealment processor 20 contains the blank period, and the output signal from the audio signal concealment processor 22 is compressed on the time axis so as to be multiplexed in this period.

The transmission output from the multiplexer 26 of the reproducing side apparatus is fed into the separator 27 of the recording side apparatus as a transmission input, and is separated into the video signal portion and audio signal portion. They are switched over with the output from the bit rate reduction encoder 12 and audio signal A/D converter 14 respectively, and fed into the error correction encoder 13 and audio signal encoder 15 to be subjected to signal processing. Then, they are modulated in the modulator 16 and recorded in the magnetic recording and reproducing system 17. The separator 27 arbitrarily switches over the video signal of ordinary input and the video signal of the transmission input, or the audio signal of ordinary input and the audio signal of the transmission input, to thereby switch over the output so as to alternately record the signal of ordinary input and the input transmission signal.

Thus, according to this embodiment, however often transmissions are carried out, the number of times of bit rate reduction encoding is only once at the time of the first recording, and the number of times of bit rate reduction decoding is only once at the time of the final output. Therefore distortions will not be accumulated due to orthogonal transform or bit rate reduction.

Figure 2:
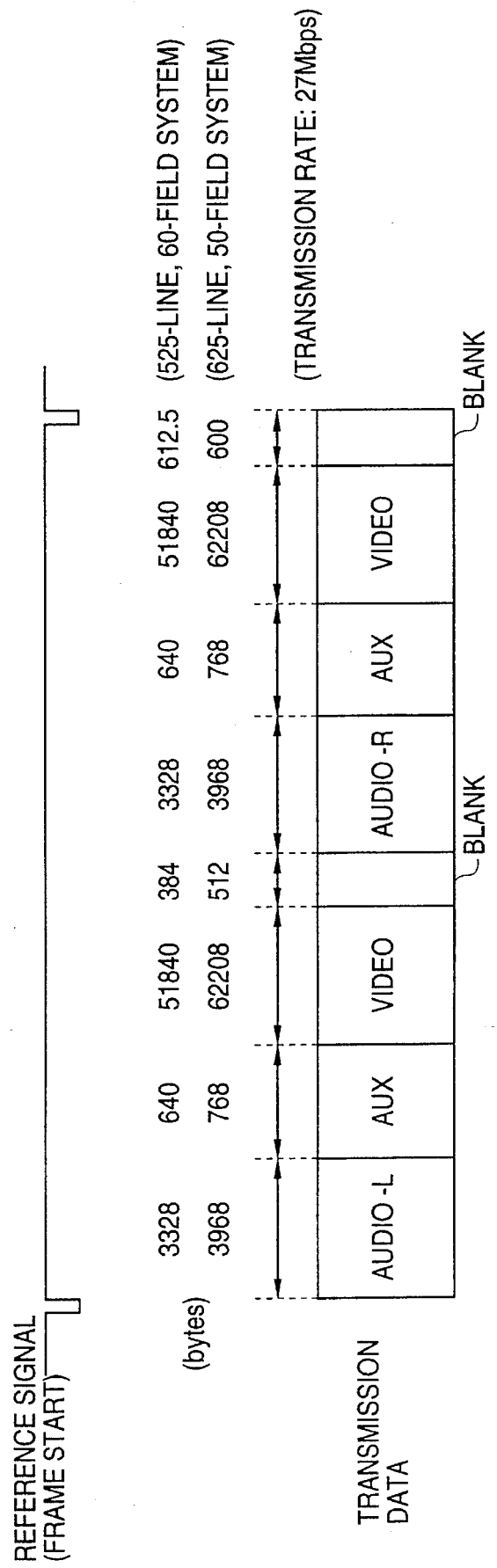
FIG. 2 is a format composition of transmission output data in a second embodiment of the invention.

An example of the format of the transmission output in a second embodiment of the invention is shown in FIG. 2. In FIG. 2, the format of transmission data output is divided into transmission data and a reference signal. As the reference signal, a frame start signal is used. (In this embodiment, the frame start signal is used, but a field start signal or a color phase start signal may be also used instead.)

Figure 3:
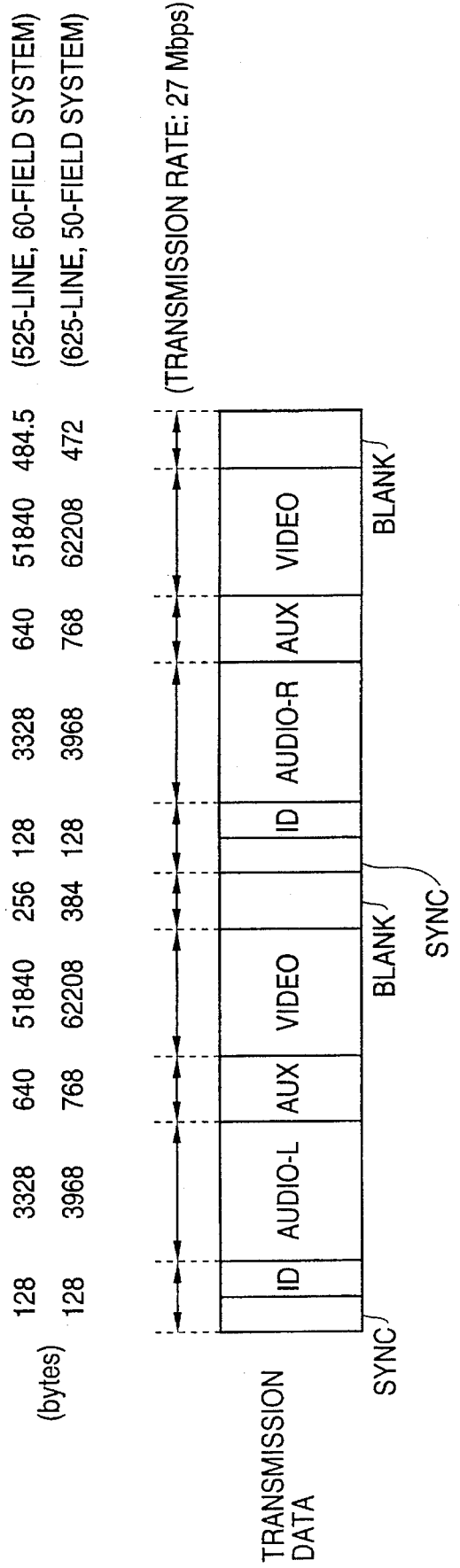
FIG. 3 is a format composition of transmission output data in a third embodiment of the invention.

A format of the transmission output in a third embodiment of the invention is shown in FIG. 3. The reference of transmission data is multiplexed on the transmission data in every field in a form of synchronization pattern (Sync) and identification code (ID). The interval of Sync, ID may be a frame or arbitrary.

Incidentally, the auxiliary data (AUX) shown in FIGS. 2, 3 are to explain the content of the signal, which must be recorded and transmitted together with video signal or audio signal. For example, such data may be the type of broadcasting system of recorded video signal (the 525-line, 60-field system, the 625-line, 50-field system, etc. ) , on/off of encryption, copy inhibition, the number of times of editing, the number of times of copying, title, and character information or, in the case of audio signal, sampling frequency and bit width. In the constitutions shown in FIGS. 2, 3, meanwhile, the locations of VIDEO, AUDIO, AUX are arbitrary, and the transmission rate and quantity of data are also arbitrary. These formats can adopt the data of various broadcasting systems as the video data, and the number of channels of the audio signal is not limited. Also, AUX may have an independent region of VIDEO or AUDIO, or may be mixed with data of VIDEO or AUDIO.

Alternately, BLANK may have a special pattern for the ease of PLL (phase locked loop) in the recording side apparatus.

Figure 4A:
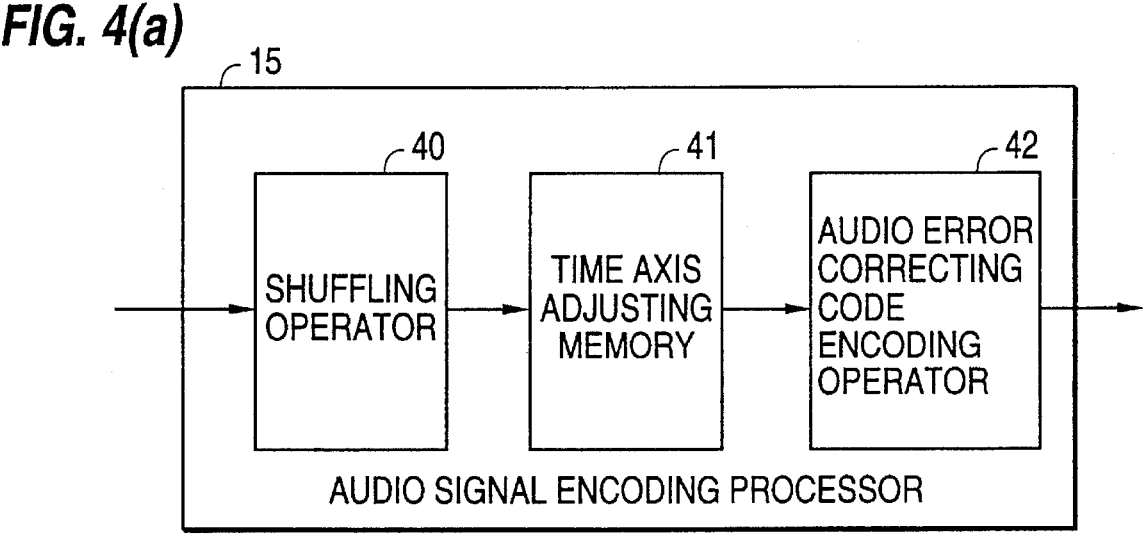
FIGS. 4(a)–4(c) are block diagrams of a fourth embodiment of the invention.
Figure 4B:
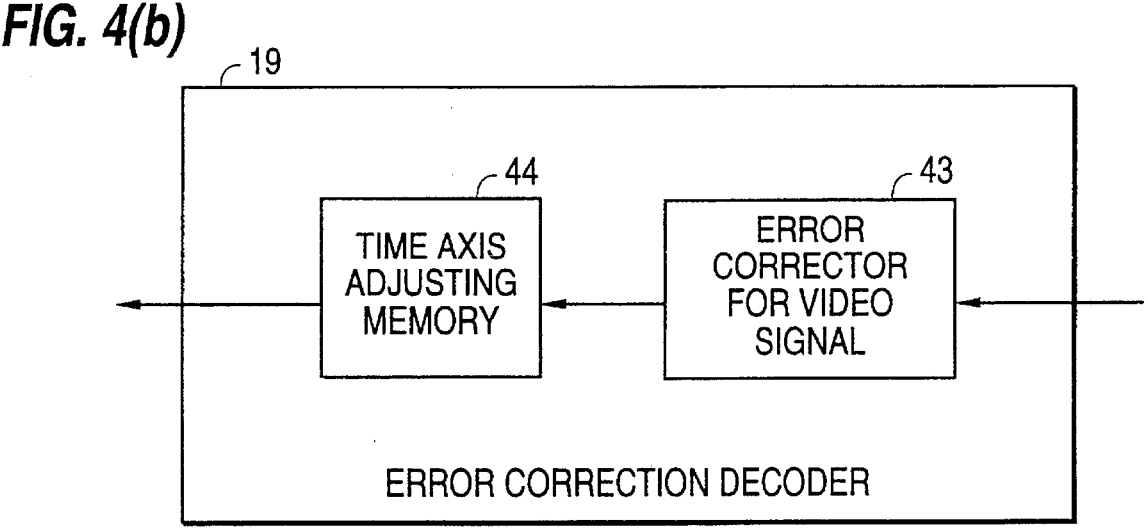
Figure 4C:
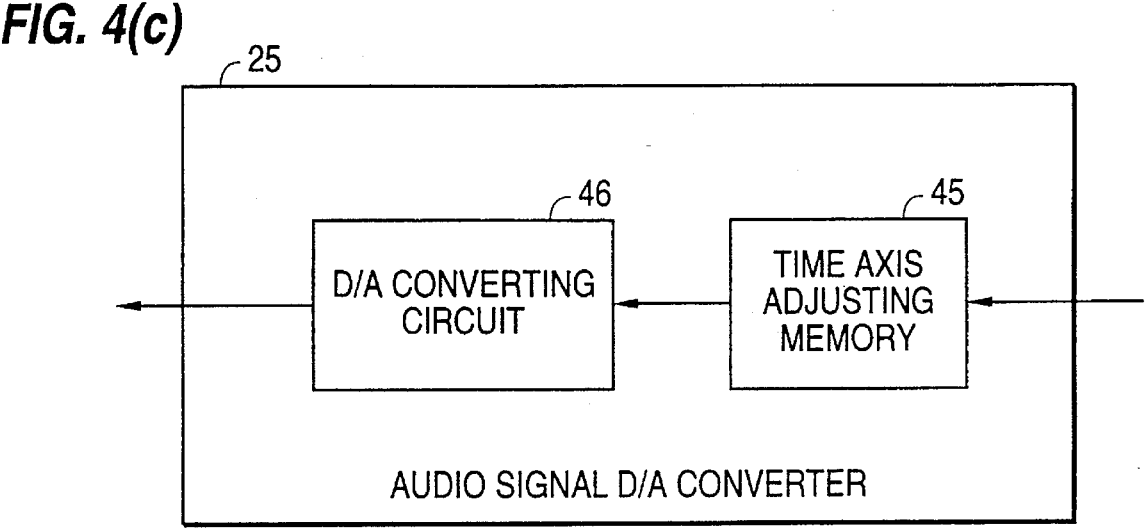

FIG. 4 is a block diagram of a fourth embodiment of the invention. FIG. 4 (a) shows the constitution of the audio signal encoding processor 15, FIG. 4 (b) shows the error correction decoder 19, and FIG. 4 (c) shows the audio signal D/A converter 25. Numeral 40 denotes a shuffling operator, 41 is a time axis adjusting memory, 42 is an audio error correcting code encoding operator, 43 is a video signal error corrector, 44 is a time axis adjusting memory, 45 is a time axis adjusting memory, and 46 is a D/A converting circuit.

The audio data and video data recorded in the magnetic recording and reproducing system 18 are kept in a certain relation of time difference in order to maintain compatibility between digital VTRs adopting the same format of bit rate reduction. In recording, the signal processing time of the circuit takes longer in video signal processing than in audio signal processing, and therefore the video data is delayed from the audio data. Accordingly, in the audio signal coding processor 15, the input audio data is shuffled in the shuffling operator 40, and delayed by the time axis adjusting memory 41, and is sent into the audio error correcting code encoding operator 42 to be subjected to an error correction encoding process. In reproducing, the video data and audio data kept at a certain relation of time difference are reproduced from the magnetic recording and reproducing system 17, and the audio data output of the audio signal concealment processor 22 is delayed in time from the video data output of the video signal concealment processor 20. In the error correction decoder 19, in order to match with the audio data in time axis, the output of the error correcting operator 43 is sent to the time axis adjusting memory 44 to be matched with the audio data in time axis. Since the outputs from the signal concealment processor 20 and audio signal concealment processor 22 are the transmission outputs, the transmission video data output and transmission audio data output are kept in the same time difference as inputted when recording. In the case of final output, the video data is processed in the bit rate reduction decoder 23, and the video data is delayed from the audio data. Therefore, the audio data is delayed by the time axis adjusting memory 45 of the audio signal D/A converter 25 so as to be matched with the video data in time axis. The constitution described above is an example. Other constitutions may be employed to adjust the video and audio signals in time axis.

According to the embodiment, in this way, by providing each functional block with the time axis adjusting memory, the time axis relation of the audio signal and video signal in recording may be regenerated at the time of reproducing in both the transmission output and ordinary final output.

Figure 6A:
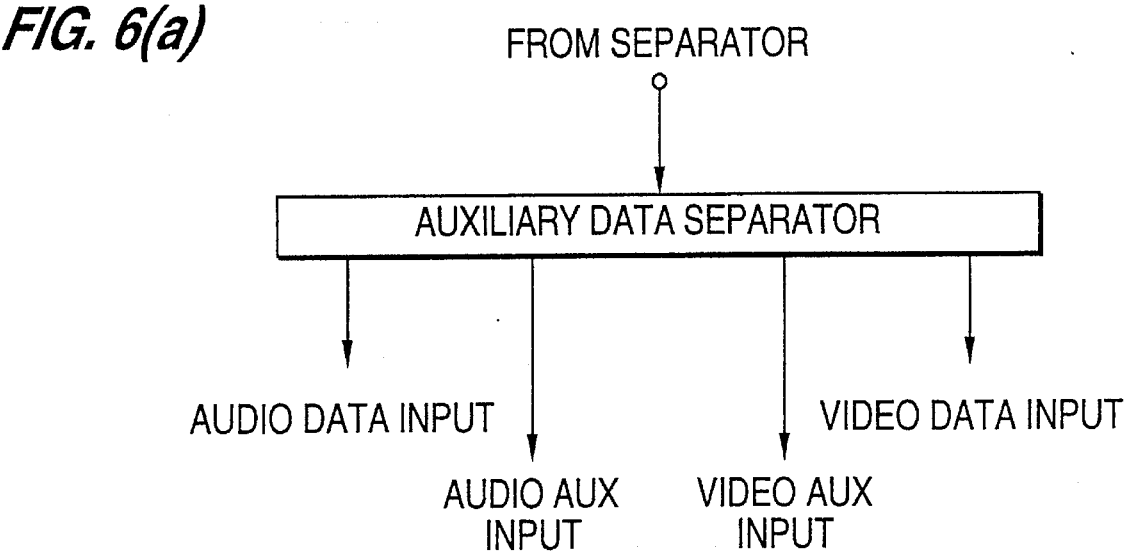
FIGS. 6(a) and 6(b) depict structures of an auxiliary data separator and auxiliary data multiplexer shown in FIG. 5.
Figure 6B:
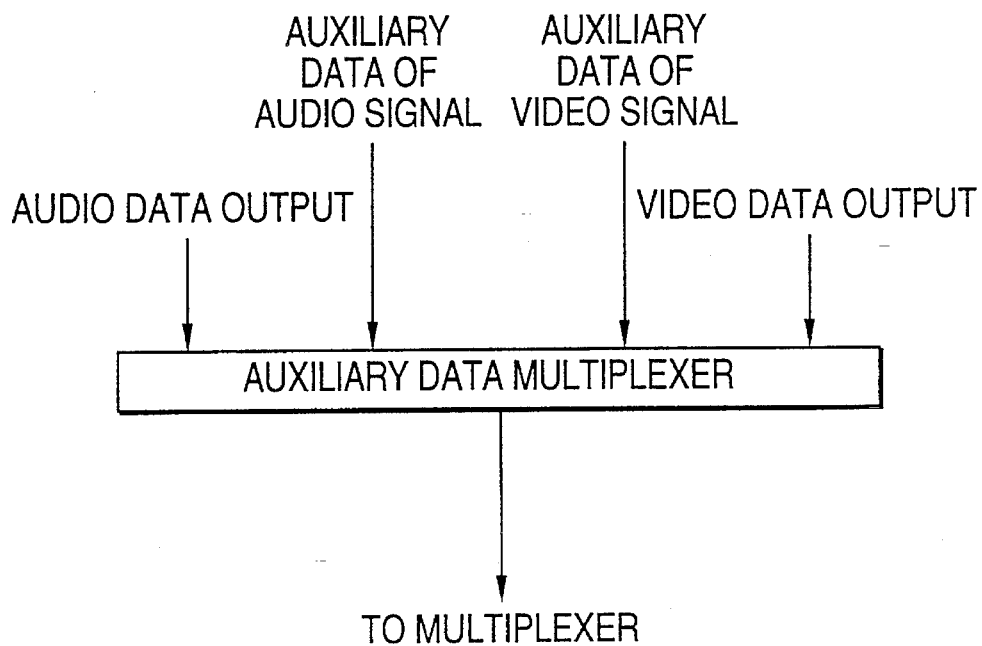

FIG. 5 is a block diagram of a fifth embodiment, and FIGS. 6(a) and 6(b)are configurations showing the auxiliary data separator and auxiliary data multiplexer. Numeral 50 is an auxiliary data separator, and 51 is an auxiliary data multiplexer. In FIG. 5, the other functional blocks are the same as those shown in FIG. 1.

The transmission output data is updated if necessary by multiplexing the information relating to the individual data on the data in the auxiliary multiplexer 51 before multiplexing the video data and audio data in the multiplexer 26. In the auxiliary data separator 50, the transmitted auxiliary data is updated if necessary. When the auxiliary data is set separately for the audio data and video data, the audio signal and video signal can be processed independently. Also, when set for each audio data, independent processing by each channel is possible. For example, where encryption is possible in the recording and reproducing apparatus, the auxiliary data multiplexer 51 processes in one of the following manners, that is, not to output data on the data for transmission output, to output data in an encrypt state, and to output data after decripting, and also multiplexes the signal showing its state. The auxiliary data separator 50 processes in one of the following manners, that is, to refer to the signal showing the state of the transmitted transmission signal, and deliver the input data directly, to output by encrypting, and to output by changing the encryption key, and when the auxiliary data is altered, even encrypted data can be transmitted and recorded if necessary.

Thus, according to the invention, the data explaining the content of the transmission signal can be also multiplexed on the transmission signal, and the video signal and audio signal can be processed independently. Meanwhile, the data for explaining the content of transmission signal is shown in an encrypted example, but the same processing is possible whatever the data may be.

Figure 7:
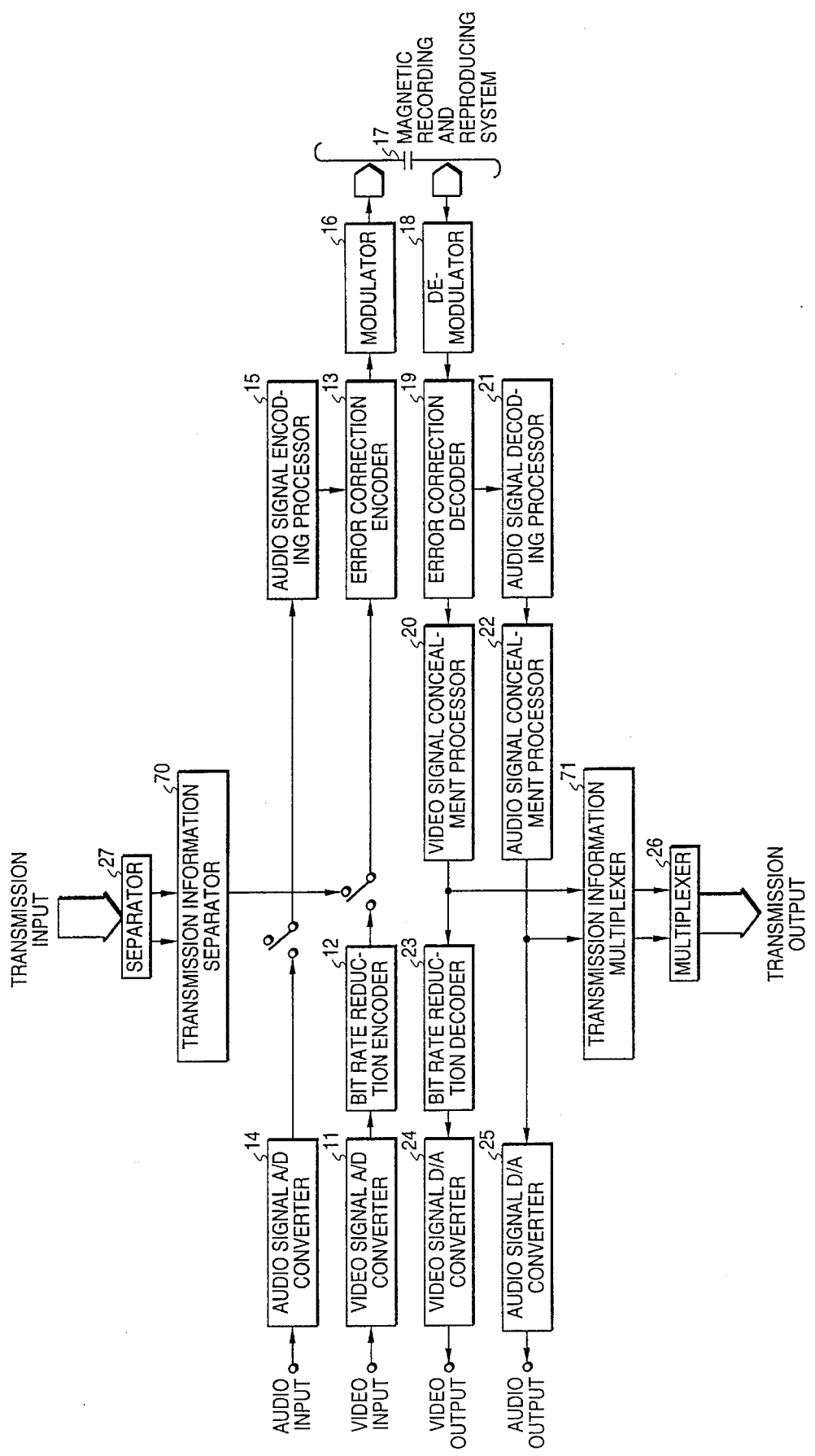
FIG. 7 is a block diagram of a Sixth embodiment of the invention.
Figure 8B:
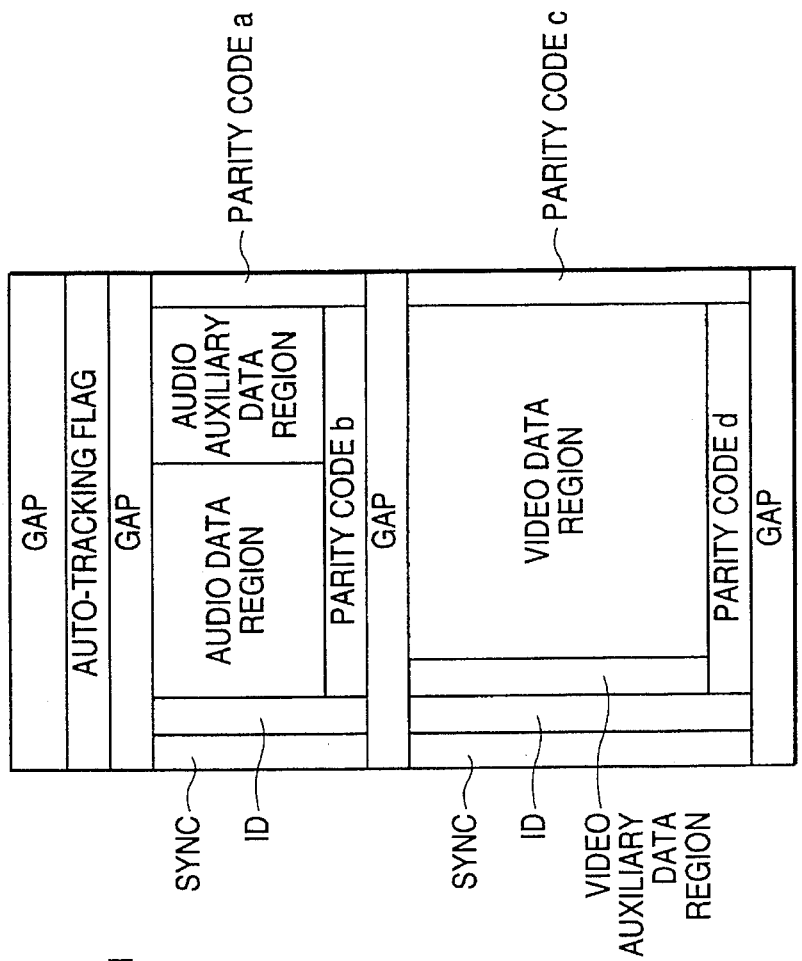
FIGS. 8(a) and 8(b) are format diagrams showing a recording format in recording medium in the invention.
Figure 8A:
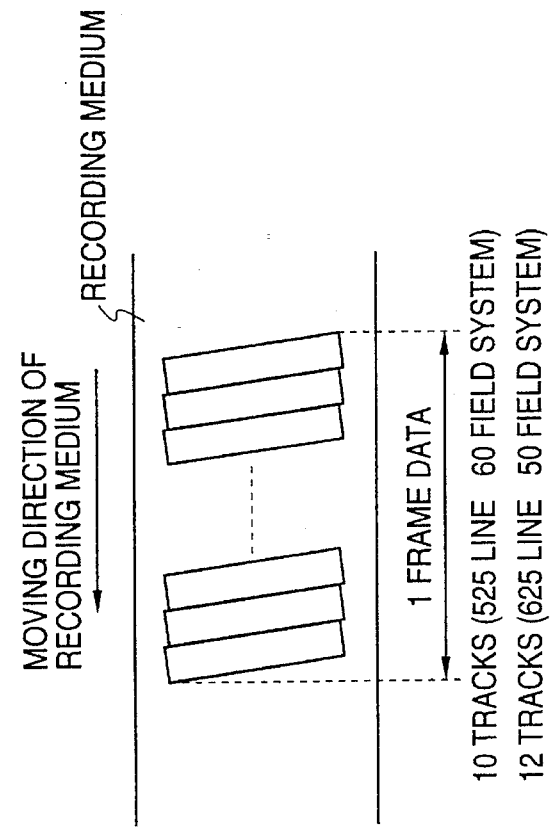
Figure 9:
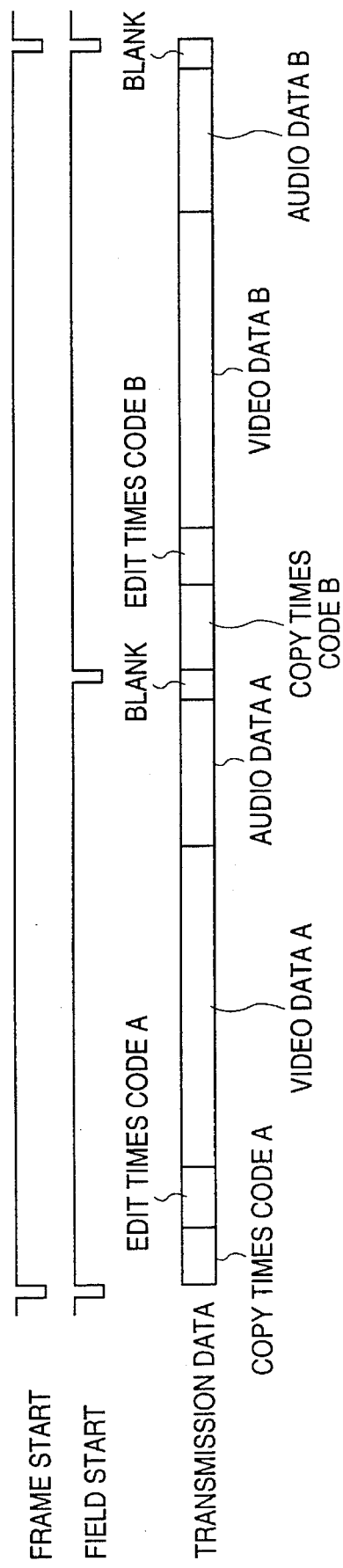
FIG. 9 is a layout of transmission data in the sixth embodiment of the invention.
Figure 10:
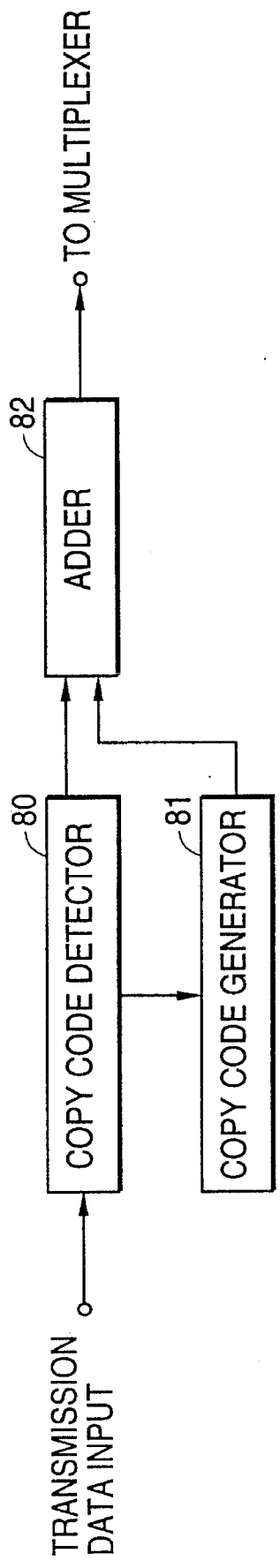
FIG. 10 is an internal configuration of transmission information multiplexer 71.
Figure 11A:
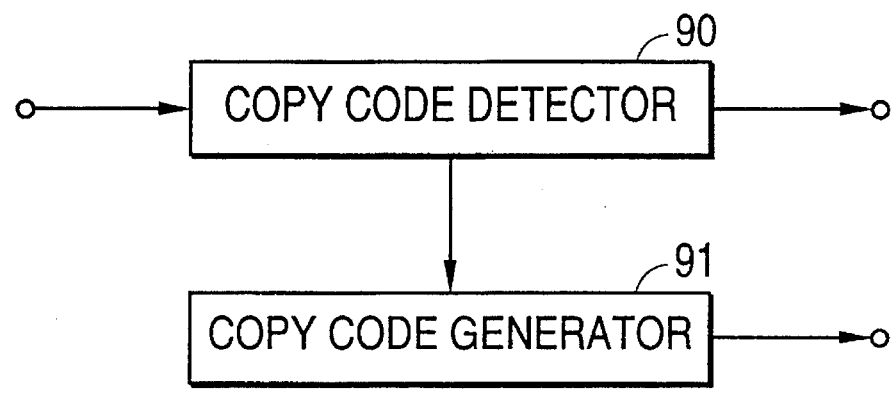
FIGS. 11(a) and 11(b) depict an internal configuration of transmission information separator 70.
Figure 11B:
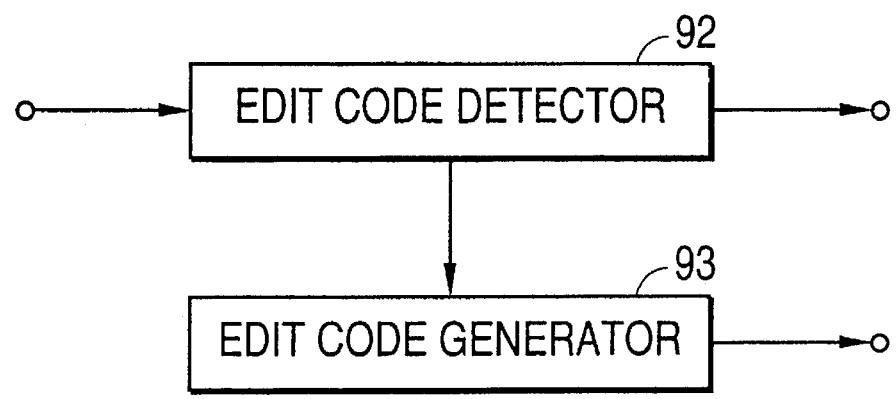

FIG. 7 is a block diagram showing the constitution of a sixth embodiment, FIG. 8 is a format diagram showing an example of recording format in the recording medium of the invention, FIG. 9 is a layout diagram of transmission data in the sixth embodiment, FIG. 10 is a configuration showing the internal structure of transmission information multiplexer 71, and FIG. 11 is a configuration showing the internal structure of transmission information separator 70. In FIG. 7, numeral 70 denotes a transmission information separator, and 71 is a transmission information multiplexer, in FIG. 10, numeral 80 is a copy code detector, 81 is a copy code generator, and 82 is an adder, and in FIG. 11, numeral 90 is a copy code detector, 91 is a copy code generator, 92 is an editing code detector, and 93 is an editing code generator.

The thus composed digital signal transmitting method is explained below.

The input video signal is A/D (analog-to-digital)-converted in the video signal A/D converter 11, and coded at high efficiency in the high efficiency encoder 12, and the error is corrected and coded in the error correction encoder 13. On the other hand, the input audio signal is A/D-converted in the audio signal A/D converter 14, and sent to the audio signal coding processor 15 for audio signal processing such as shuffling, and error correction encoding, and it is multiplexed with the video signal from the error correction encoder 13. (As an embodiment of the invention, the audio signal is not subjected to high efficiency coding processing, but it is the same when subjected to high efficiency coding processing as audio data.) When the error correction code of the audio signal is common with a part or the whole of the error correction code of the video signal, the error correction coding processing of the audio signal of the common portion may be done in the error correction encoder 13. The signal is then modulated in the modulator 16, and recorded in the magnetic recording and reproducing system 17. An example of the format recorded in the recording medium in the magnetic recording and reproducing system 17 is shown in FIG. 8. In the format as shown in FIG. 8, the video signal and audio signal respectively have independent auxiliary data regions, and when recording the signal in ordinary input, 0 is respectively written in the audio auxiliary data region and video auxiliary data region as the data of the code of the number of times of copy and the code of the number of times of editing to be recorded individually.

The data reproduced from the magnetic recording and reproducing system 17 is demodulated in the demodulator 18, and is corrected in the error correction decoder 19, and an uncorrectable error is concealed in the video signal concealment processor 20. The signal obtained at this moment is used as the video signal portion of the transmission output. After error correction coding and audio signal processing such as deshuffling in the audio signal decoding processor 21, an uncorrectable error is concealed in the audio signal concealment processor 22. The signal obtained at this point is used as the audio signal portion of transmission output. Each transmission output signal detects the code of the number of copies and the code of the number of editings reproduced from the recording medium. When the copy code is detected by the copy code detector 80, the copy code generator 81 is started up. The started copy code generator 81 delivers the addition value 1 of the number of times code to an adder 82. In the adder 82, by adding the output signal of the copy code generator 82 to the copy number of times code reproduced from the recording medium, the number of times of copying is updated and delivered to the multiplexer 26. Since the editing number of times code is not updated unless the video data coded at high efficiency is once decoded at high efficiency, and therefore the value of the editing number of times code reproduced from the recording medium is directly delivered. The audio data signal and video data signal sent to the multiplexer 26, and the individual copy number of times code and editing number of times code are arranged in the data array, for example as shown in FIG. 9, and delivered as the transmission output. The transmission signal sent from the reproducing side is separated into the audio data and video data in the separator 27, and the audio data and video data detect the respective copy number of times code and editing number of times code in the transmission information separator 70. From the transmission data being sent forth, when the copy code is detected by the copy code detector 90, the copy code values of the audio data and video data reproduced in the copy code generator 91 are converted into a data array (FIG. 8 (a)) so as to be part of audio data or video data, and recorded in the recording medium as the transmission information region of the audio data or video data. When the editing number of times code is detected from the transmission data in the editing code detector 92, the editing code values of audio data and video data are converted into a data array (FIG. 8 (b)) so as to be part of audio data or video data, and recorded into the auxiliary data region of audio data or video data.

If the reproducing side sends either the audio data or the video data, or either channel 1 or channel 2 as for audio data, to the recording side as transmission output, since the copy number of times code and editing number of times code are individually possessed, the copy number of times code and editing number of times code of the data to be transmitted may be updated at the reproducing side.

Thus, according to the invention, by updating the copy number of times code upon every transmission, the number of times of transmission can be controlled. The recording format shown in FIG. 8 is only an example, and the digital signal transmitting method of the invention may be applied without particularly defining the recording format.

Figure 13:
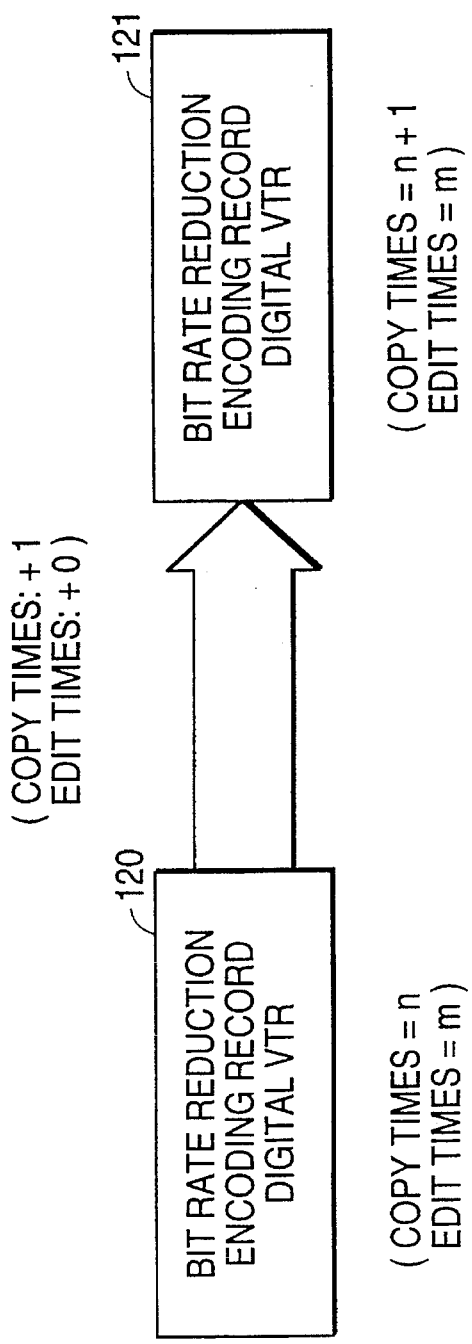
FIG. 13 is an explanatory diagram showing the changes of transmission information by transmission without passing through an editing machine.
Figure 14:
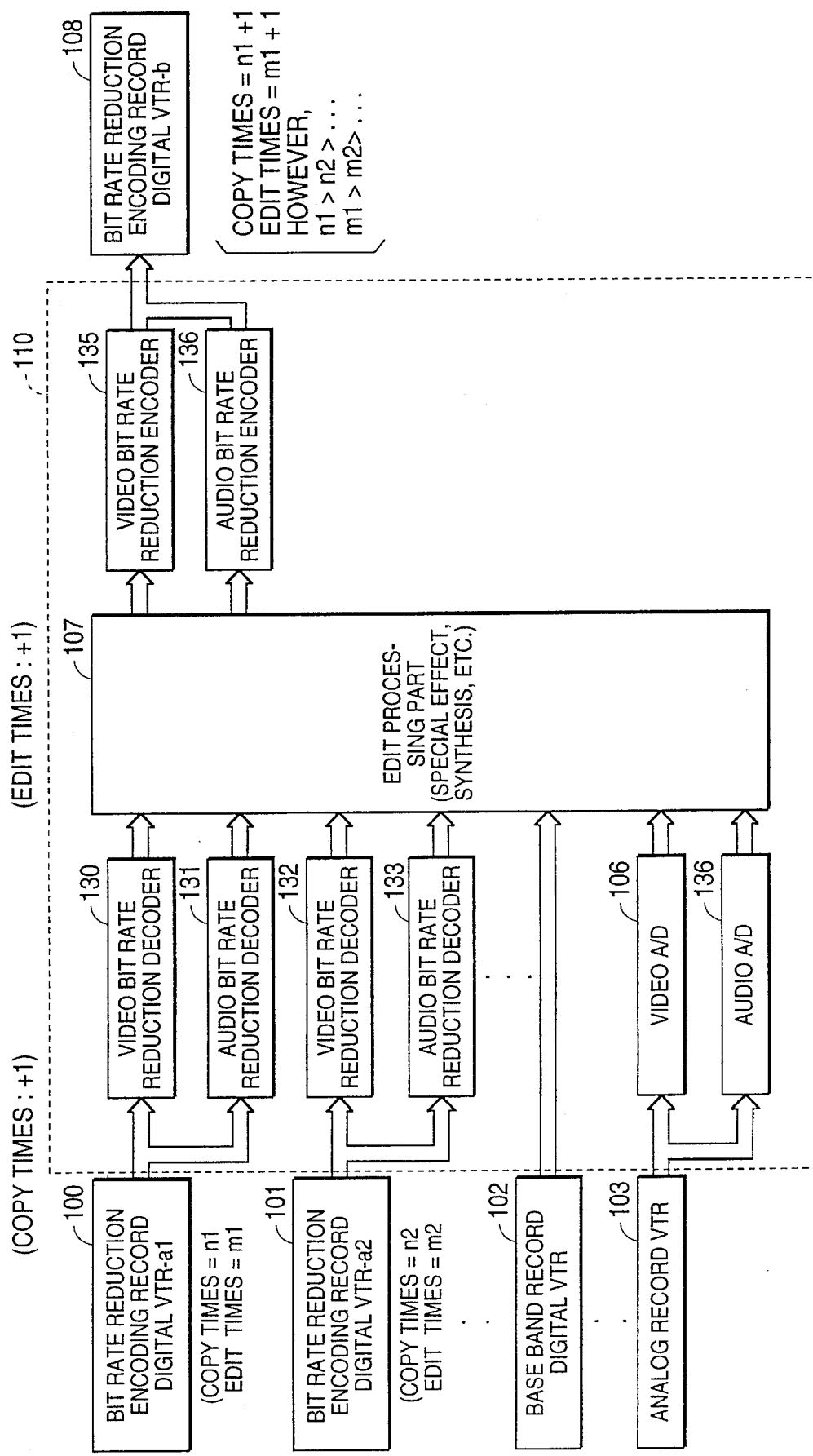
FIG. 14 is a block diagram of an eighth embodiment of the invention.

FIG. 12 is a block diagram showing the configuration of a seventh embodiment, FIG. 13 is an explanatory diagram showing changes of transmission information by transmission without resort to an editing machine, FIG. 14 is a block diagram showing the configuration of an eighth embodiment, and FIG. 15 is a configuration of the transmission information updating device of the editing processing device in the seventh embodiment. In FIG. 12, numeral 100 is a high efficiency coding recording digital VTR-a1, 101 is a high efficiency coding digital recording VTR-a2, 102 is a base band recording digital VTR, 103 is an analog recording VTR, 104, 105 are high efficiency decoders, 106 is a video signal A/D converter, 107 is an editing processor, 108 is a high efficiency encoder, 109 is a high efficiency coding recording digital VTR-b, and 110 is an editing machine. In FIG. 13, numerals 120, 121 are high efficiency coding recording digital VTRs. In FIG. 14, numerals 130, 132 are video high efficiency decoders, 131, 133 are audio high efficiency decoders, 134 is an audio A/D converter, 135 is a video high efficiency encoder, and 136 is an audio high efficiency encoder. In FIG. 15, numeral 150 is an editing code detector, 151 is a comparator, 152 is an adder, 153 is a copy code detector, 154 is a comparator, and 155 is an adder.

Transmission of the reproduction signal between high efficiency coding recording VTRs is effected by sending the data in the data array as shown in FIG. 9 without processing the transmission output, and therefore as the transmission information data, only the copy number of times code is updated as shown in FIG. 13. The editing machine is used by the user for making special processing and synthesis of an arbitrary image on the transmission video data between high efficiency coding recording VTRs. The video signal of the transmission data has been processed by high efficiency coding, and for this editing, it requires high efficiency decoding processing. The transmission through the editing machine is explained below.

The transmission signal leaving the high efficiency coding recording digital VTR-a1 100 is fed into the editing machine 110, and the video data is processed by high efficiency decoding in the high efficiency decoder 104, and special processing on the video signal is effected in the editing processing part 107. After editing in the editing processing part 107, again in the high efficiency encoder 108, high efficiency coding is processed, and it is recorded as transmission data in the high efficiency coding recording digital VTR-b 109. If the error modification cannot be done in the compressed state, right after high efficiency coding in the editing machine, it is processed together with the transmission data just before the editing processing part.

The processing of transmission information data in transmission using the editing machine is described below.

The transmission signal leaving the high efficiency coding recording digital VTR-a1 100 has been updated only in the copy number of times code out of the transmission information data of the transmission output (one count up from the value reproduced from the recording medium) as explained in the embodiments in FIGS. 12, 13, 14. The video data coded at high efficiency in the editing machine 110 is decoded at high efficiency in the high efficiency decoder 104, and edited in the editing processing part 107, and is coded at high efficiency again in the high efficiency encoder 108 and is delivered. However, decoding and recoding of the data once coded at high efficiency results in a deteriorated picture quality as the distortions are accumulated by repetition of the high efficiency decoder and encoder, as compared with the data before first decoding.

Delivering the editing number of times codes updated by counting up by one the editing number of times code of the transmission information data of the data edited in the editing processing part 107, by recording in the high efficiency coding recording digital VTR-b 109 through the high efficiency encoder 108, the deterioration state of the recorded data may be understood by searching the editing code when re-editing the recorded video data.

When both video data and audio data in the transmission output are processed by high efficiency coding, as shown in FIG. 14, from the transmission output of the high efficiency coding recording digital VTR-a1 100, the video data and audio data are separated by the editing machine 107, and the video data is processed by high efficiency decoding in the video high efficiency decoder 130, and the audio data in the audio high efficiency decoder 131, and after finishing editing in the editing processing part 107, the video data is coded at high efficiency in the video high efficiency encoder 135, and the audio data in the audio high efficiency encoder 136, and both are recorded in the high efficiency coding recording digital VTR-b 109. Furthermore, since the data array of the transmission data is as shown in FIG. 9, needless to say, the editing number of times code can be processed individually for video data and for audio data. Explained next is the case of plural high efficiency coding recording digital VTRs connected as reproducing units to the editing machine.

When the bit rate reduction encoding recording digital VTR-a1 100 and bit rate reduction encoding recording digital VTR-a2 101 are connected as reproducing units (for example, two reproducing units are connected), for the purpose of editing, as mentioned above, since the data encoded must be decoded, and therefore the transmission outputs from the digital VTR-a1 100 and digital VTR-a2 101 are respectively processed by bit rate reduction decoding in the bit rate reduction decoders 104, 105, and are entered into the editing machine 110. In the editing machine 110, as mentioned above, at the time of output of the editing processing part 107, the editing number of times code values are updated, but the individual editing times codes may differ, and therefore, the individual editing number of times codes are detected by the editing code detector 150 from the plural sets of transmission data entered in the editing machine 107, and the comparator 151 is started up by the detected editing number of times code, and the plural editing code values are compared, and the maximum value of the editing code is maintained, and the editing number of times code held in the adder 152 is updated and delivered to the editing machine 110, thereby recording to show the data has been edited together with the transmission data in what state. Further, the copy number of times codes may also differ, and, the same as in the editing number of times codes, the copy code is detected from the transmission data by the copy code detector 153, and the comparator 154 is started up by the detected editing number of times code, and the plural copy code values are compared to maintain the maximum value of editing code, and the copy code held in the adder 155 is updated and recorded as the output of the editing machine. If the audio data is fed in the editing machine in the bit rate reduction encoded state, it may be handled by incorporating the constitution of FIG. 15 into the editing processing part 107 in the structure as shown in FIG. 14. Furthermore, since the data array of transmission data is as shown in FIG. 9, it is needless to say that the editing number of times code may be processed separately for video data and for audio data.

In this way, if the transmission data between plural bit rate reduction encoding recording digital VTRs are edited, by recording the transmission information data of the largest number of times of editing and copying number of times used in editing, the state of the data may be understood when transmitting the recorded data of the recording signal again.

In the next, a case is explained, in which plural bit rate reduction encoding recording digital VTRs and the digital VTR without bit rate reduction encoding recording or analog recording VTR are connected to the editing machine.

The data array of the transmission output of the bit rate reduction encoding recording digital VTR is as shown in FIG. 9, and for example, in the base band digital VTR 102 or analog recording VTR 103 in which the video signal and audio signal are merely A/D, D/A converted and recorded and reproduced, the control information of the data being recorded is not present, and when these inputs are fed into the editing machine 110, they are regarded as original signals in the editing processing part 107, and the editing number of times code and copy number of times code are newly set as 0, and delivered from the editing processing part 107. Also, the audio data of the bit rate reduction encoding recording digital VTR is in the bit rate reduction encoded state, and when entered in the editing machine, it can be handled by incorporating the constitution shown in FIG. 15 in the editing processing part 107 in the structure shown in FIG. 14. Further, the data array of transmission data is as shown in FIG. 9, and the editing number of times code may be processed separately for video data and for audio data.

In the foregoing embodiments, the relation of the time difference maintained between the audio signal and video signal entered at the time of recording is shown to be reproduced also in the ordinary output, but if this relation cannot be maintained in the ordinary output, the contents of the embodiments herein may be easily applied.

The next description relates to the operation of a monitor in the recording side apparatus during transmission.

Figure 16:
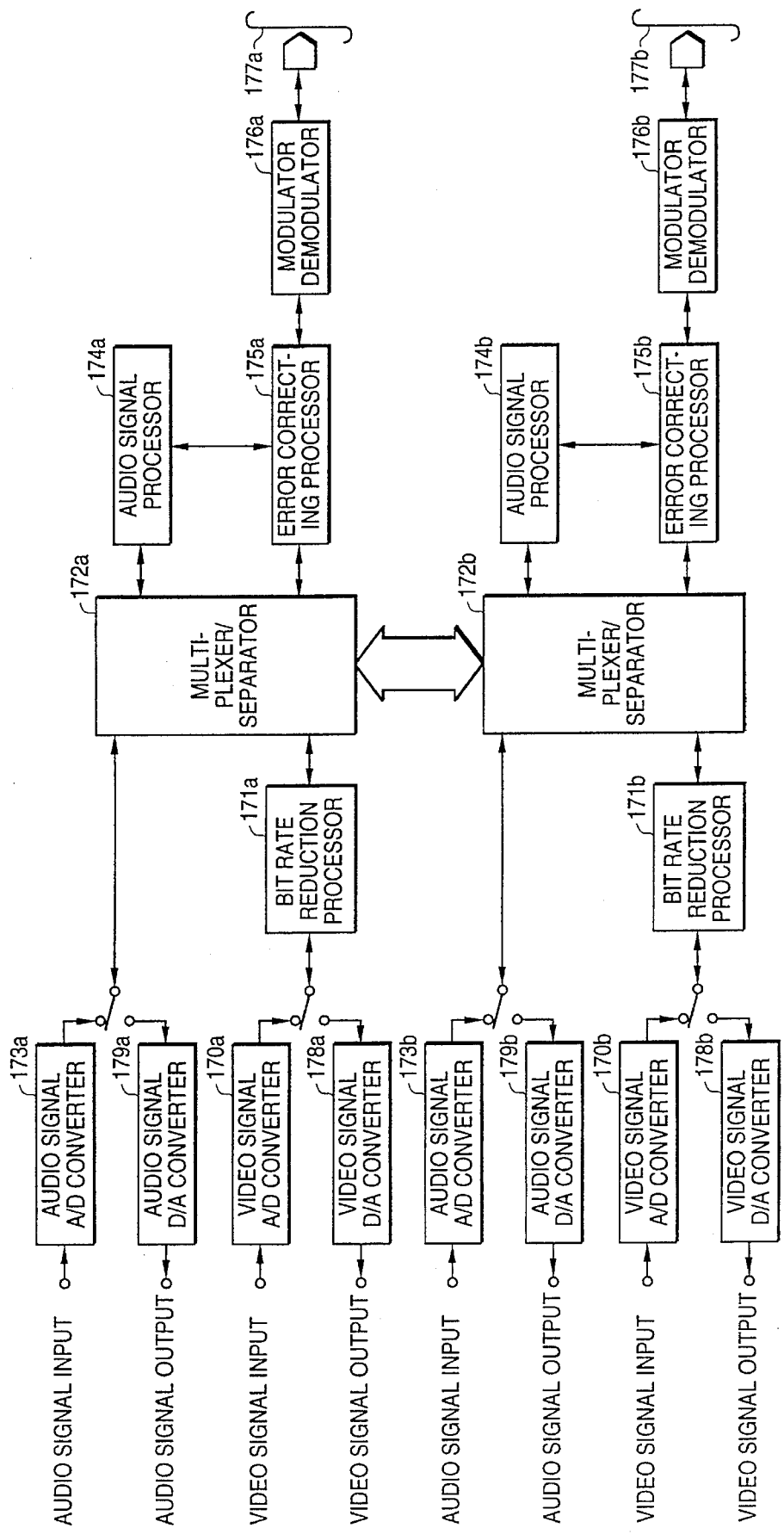
FIG. 16 is a block diagram for explaining a digital signal transmitting method in a ninth embodiment of the invention.
Figure 17:
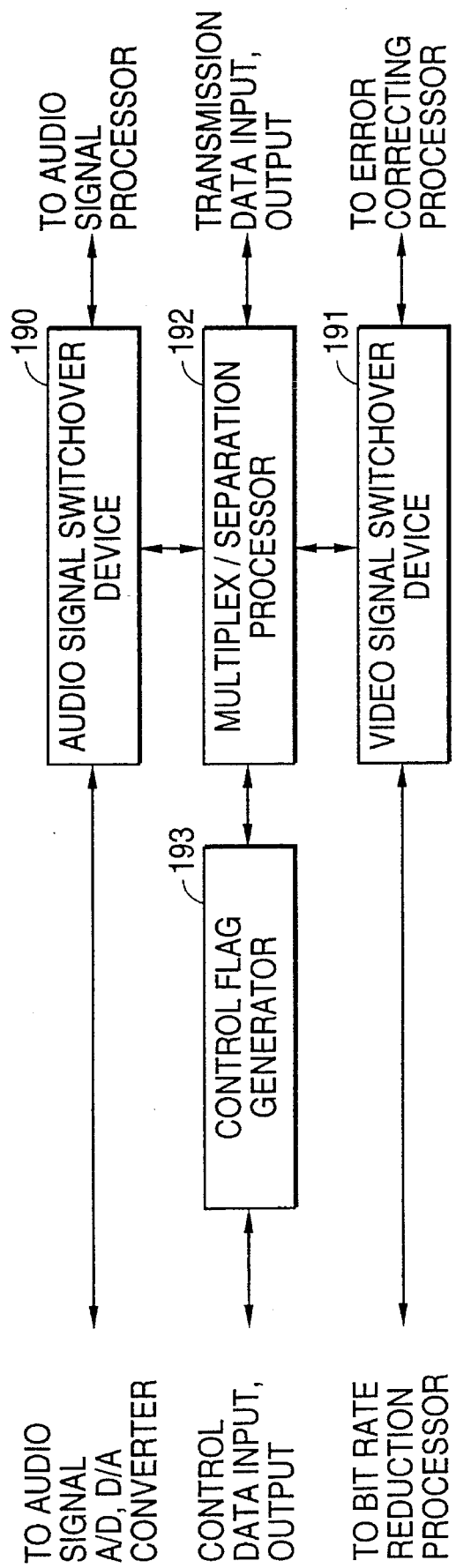
FIG. 17 is an internal structure of multiplexers/separators 172a, b in FIG. 16.
Figure 18:
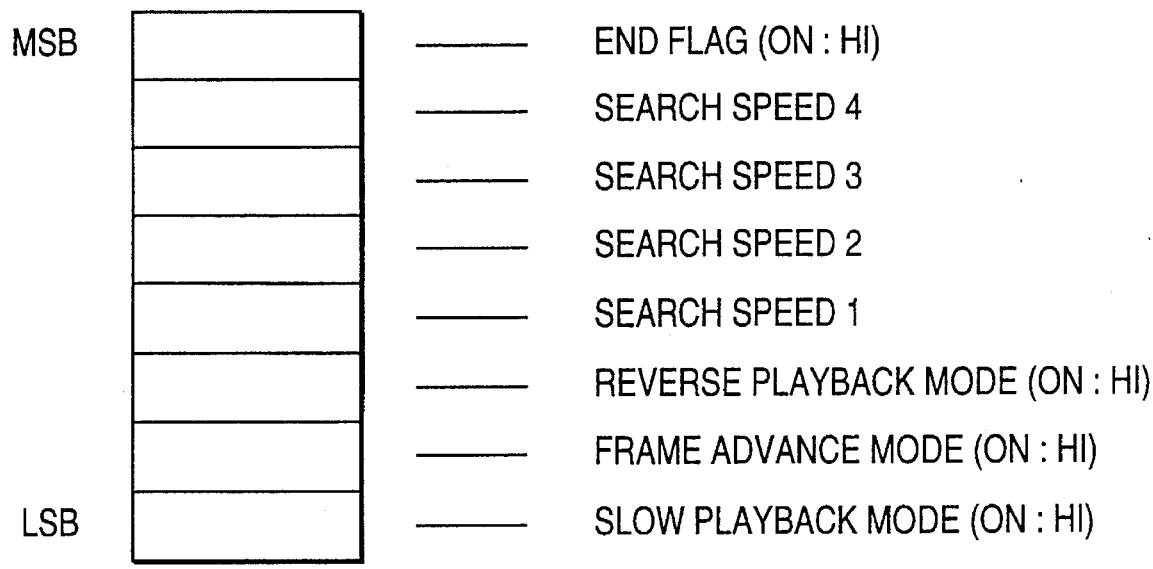
FIG. 18 is a bit configuration showing an example of an output bit configuration of a control flag generator 193 in FIG. 17.
Figure 19:
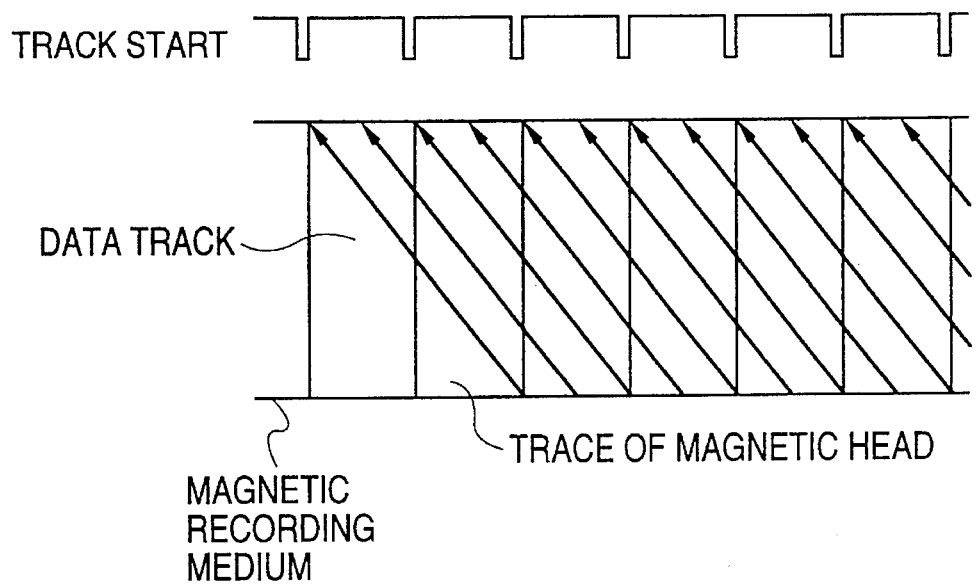
FIG. 19 is an explanatory diagram showing the track of the magnetic head in a slow playback mode.

FIG. 16 is a block diagram showing the digital signal transmitting method in a ninth embodiment of the invention. FIG. 17 shows a configuration of a multiplexer/separator, FIG. 18 is a bit array diagram showing an example of bit array of the output of a control flag generator 193, and FIG. 19 shows the traces of magnetic head in a slow playback mode. Numerals 170a, b are video signal A/D converters, 171a, b are bit rate reduction processors, 172a, b are multiplexer/separators, 173a, b are audio signal A/D converters, 174a, b are audio signal processors, 175a, b are error correcting processors, 176a, b are modulators/demodulators, 177a, b are magnetic recording and reproducing systems, 178a, b are video signal D/A converters, 179a, b are audio signal D/A converters, 190 is an audio signal switchover device, 191 is a video signal switchover device, 192 is a multiplex/separation processor, and 193 is a control flag generator. In the thus composed recording and reproducing apparatus, the ordinary recording and reproducing operation is first explained.

In recording, the input video signal is A/D-converted in the video signal A/D converter 170a, and bit rate reduction encoded in the bit rate reduction processor 171a. The bit rate reduction encoded video data is sent into the error correction coding processor 175a via the multiplexer/separator 172a. The audio signal inputted simultaneously is A/D-converted in the audio signal A/D converter 173a, and is processed by shuffling in the audio signal processor 174a through the multiplexer/separator 172a, and is sent into the error correcting processor 175a. After error correction encoding process and multiplexing of video data and audio data in the error correcting processor 175a, the data is modulated in the modulator/demodulator 176a, and recorded in the magnetic recording and reproducing system 177a.

In reproducing, the data reproduced from the magnetic recording and reproducing system 177a is demodulated in the modulator/demodulator 176a, and is sent to the error correcting processor 175a for error correction decoding process and error concealment processing, and the video data is delivered to both the bit rate reduction processor 171a and multiplex/separator processor 192 at the video signal switchover device 191 of the multiplex/separator 172a. In the multiplexer/separator 192, the audio data is multiplexed on the video signal, and the bit rate reduction processor 171a processes the video signal by bit rate reduction decoding, and delivers after D/A conversion in the video signal D/A converter 178a. The audio data, after processing by error correction decoding, is sent into the audio signal processor 174a for deshuffling process and error concealment process, and is delivered to both audio signal D/A converter 179a and multiplex/separation processor 192 at the audio signal switchover device 190 of the multiplexer/separator 172a. The audio signal is delivered after D/A conversion in the audio signal D/A converter 179a.

When transmitted from the multiplexer/separator 172a to the multiplexer/separator 172b in the constitution as shown in FIG. 16, the recording side apparatus separates the input transmission signal into the audio data and video data by means of the multiplex/separation processor 192 of the multiplexer/separator 172b. The separated audio data is delivered to both audio signal processor 174b and audio signal D/A converter 179b by the audio signal switchover device 190, while the video data is delivered to both error correcting processor 175b and bit rate reduction processor 171b by the video signal switcheover device 191. The audio signal processor 174b, error correcting processor 175b, and modulator/demodulator 176b operate to record and process as mentioned above. When recording the transmission signal, by setting the functional block not necessary for recording and processing of transmission signal in the reproducing state to function, the audio data is D/A-converted by the audio signal D/A converter 179b, and delivered, while the video data is bit rate reduction decoded in the bit rate reduction processor 171b, D/A-converted by the video signal D/A converter 178b, and delivered.

In this constitution, monitoring of the transmission data can be done by the recording side apparatus.

When the reproducing side apparatus is in a trick play mode, the operation is as follows. In the constitution as shown in FIG. 16, when performing a trick play such as search, slow or frame advance in order to find the editing start point by the reproducing side apparatus, the block for reproduction processing for monitoring in the recording side apparatus cannot monitor unless the recording side apparatus knows which trick play is performed at the reproducing side apparatus. When the reproducing side apparatus is in a trick play mode, a trick play mode control signal of the magnetic recording and reproducing system 177a is sent to the control flag generator 193 of the multiplexer/separator 172a, and is converted to the bit array of control flag as shown in FIG. 18. The converted control flag is multiplexed on the transmission data in the multiplexer/separator 192. In the recording side apparatus, from the incoming transmission data output, the control flag is separated in the multiplexer/separator 172b, and the bit rate reduction processor 171b of the recording side apparatus is controlled depending on the control flag.

The operation in a slow playback mode is described below. In this example, bit rate reduction is effected in the unit of one frame, and the final output for the slow playback mode is supposed to be realized in the field unit. In the slow playback mode, as shown in FIG. 19, since the magnetic head moves on plural data tracks, the data is reproduced partially from each track. In this case, therefore, by controlling two memories, the memory possessed by the error correcting processor 175a and the memory possessed by the bit rate reduction processor 171a, it is processed so that the screen may be delivered correctly in one field unit. First, in the memory of error correcting processor 175a, by the track number and data number indicated by the ID (identification) signal of the reproduced data, the memory address is generated, and data is written into the memory using the address. At the same time, by the track ID signal, the reproduction state of data is detected in ½ frame unit. That is, when the end of reproduction of data of ½ frame portion is detected, the end flag is set to ON. In the bit rate reduction processor 171a, only when the end flag is set to ON, the data is bit rate reduction decoded, and the result is written into the memory, and the field for final output is switched over at the same time. More specifically, since the data quantity of 1 field and the data quantity of ½ frame are equal to each other when the end flag is ON, while delivering the 1 field data which is read last from the memory, ½ frame data is written by using the read address at the same time. When the end flag is OFF, the field being presently delivered is repeatedly delivered.

In this method, in the case of slow reproduction of 1/n times, the output field can be switched over in every period of n fields in average.

To perform the similar processing in the recording side apparatus, the control flag indicating that the reproducing side apparatus is in a slow playback mode and the end flag are transmitted to the recording side apparatus. In the bit rate reduction processor 171b of the recording side apparatus, on the basis of the transmitted end flag, the same processing as in the reproducing side apparatus is conducted. On the other hand, as for the audio signal, when the reproducing side apparatus is in a slow playback mode, it is not necessary to deliver the audio signal, and therefore the output to the audio signal D/A converter 179*b* is suspended.

Alternately, when the reproducing side apparatus is in a reverse playback mode, the transmitted data must be delivered in the reverse order of ordinary reproduction, that is, in the sequence of the second field and first field, when delivering the data of one frame in the field unit. Therefore, a control flag denoting the reverse playback mode is sent to the recording side apparatus, and the video data is delivered to the video signal D/A converter 180*b* by the memory of the bit rate reduction processor 171*b* of the recording side apparatus, in the sequence of the second field data and first field data.

The control flag shown in FIG. 18 is only an example, and the composition of control flag, bit array and bit pattern are not particularly defined. In this embodiment, meanwhile, the unit of bit rate reduction is one frame, but similar processing is possible as far as it is an integer multiple of one field.

In this constitution, even if the reproducing side apparatus is in a trick play mode, the recording side apparatus can recognize the video signal.

What is claimed is:

1. A method of transmitting digital signals between a first apparatus having a function of recording a bit rate reduction encoded digital video signal and a digital audio signal on a recording medium and a second apparatus having a function of reproducing from a recording medium a recorded bit rate reduction encoded digital video signal, a recorded digital audio signal and a recorded additional information signal containing information concerning the recorded bit rate reduction encoded digital video signal and information concerning the recorded digital audio signal, said method comprising the steps of:

reproducing a recorded bit rate reduction coded video signal, a recorded digital audio signal and a recorded additional information signal from a recording medium at said second apparatus to obtain a reproduced bit rate reduction coded digital video signal, a reproduced digital audio signal and a reproduced additional information signal, respectively;

time-division multiplexing the reproduced digital audio signal with the reproduced bit rate reduction coded digital video signal and with the reproduced additional information signal at said second apparatus to obtain a multiplexed transmission signal;

transmitting said transmission signal from said second apparatus;

receiving at said first apparatus said transmission signal transmitted from said second apparatus;

separating the received transmission signal at said first apparatus into said reproduced bit rate reduction coded digital video signal, said reproduced digital audio signal and said reproduced additional information signal; and recording at said first apparatus said reproduced bit rate reduction coded digital video signal, said reproduced digital audio signal and said reproduced additional information signal which have been separated by the separating step on another recording medium;

wherein said method further comprises, between the reproducing step and the transmitting step, the steps of detecting errors contained in said reproduced bit rate reduction encoded digital video signal and said reproduced digital audio signal to obtain detected errors, correcting correctable errors among said detected errors, and concealing uncorrectable errors among said detected errors;

wherein a time difference between said reproduced bit rate reduction encoded digital video signal and said reproduced digital audio signal at the time-division multiplexing step is the same as a time difference between an original video signal from which said recorded bit rate reduction encoded digital video signal was produced and an original audio signal from which said recorded digital audio signal was produced;

wherein a time difference between said reproduced bit rate reduction encoded digital video signal and said reproduced digital audio signal in said transmission signal in the transmitting step is the same as a time difference between an original video signal from which said recorded bit rate reduction encoded digital video signal was produced and an original audio signal from which said recorded digital audio signal was produced;

wherein the time-division multiplexing step includes multiplexing said reproduced bit rate reduction encoded digital video signal, said reproduced digital audio signal and said additional information signal so that said additional information signal is included as is in said transmission signal;

wherein said additional information signal includes a copy number code indicating a number of copies previously made and an editing number code indicating a number of editings previously made, wherein said method further comprises the steps of extracting at said first apparatus said copy number code and said editing number code from the received transmission signal, and incrementing the extracted copy number code by one to obtain a new copy number code, and wherein said recording step records the extracted editing number code as is and said new copy number code on said another recording medium; and wherein each of said copy number code and said editing number code is separated into a code for video signal channel and a code for audio signal channel, and wherein each of said code for video signal channel and said code for audio signal channel is processed independently of the other.

2. A method of transmitting digital signals between a first apparatus having a function of recording a bit rate reduction encoded digital video signal and a digital audio signal on a recording medium and a second apparatus having a function of reproducing from a recording medium a recorded bit rate reduction encoded digital video signal, a recorded digital audio signal and a recorded additional information signal containing information concerning the recorded bit rate reduction encoded digital video signal and information concerning the recorded digital audio signal, said method comprising the steps of:

reproducing a recorded bit rate reduction coded video signal, a recorded digital audio signal and a recorded additional information signal from a recording medium at said second apparatus to obtain a reproduced bit rate reduction coded digital video signal, a reproduced digital audio signal and a reproduced additional information signal, respectively;

time-division multiplexing the reproduced digital audio signal with the reproduced bit rate reduction coded digital video signal and with the reproduced additional information signal at said second apparatus to obtain a multiplexed transmission signal;

transmitting said transmission signal from said second apparatus;

receiving at said first apparatus said transmission signal transmitted from said second apparatus;

separating the received transmission signal at said first apparatus into said reproduced bit rate reduction coded digital video signal, said reproduced digital audio signal and said reproduced additional information signal; and recording at said first apparatus said reproduced bit rate reduction coded digital video signal, said reproduced digital audio signal and said reproduced additional information signal which have been separated by the separating step on another recording medium;

wherein said method further comprises, between the reproducing step and the transmitting step, the steps of detecting errors contained in said reproduced bit rate reduction encoded digital video signal and said reproduced digital audio signal to obtain detected errors, correcting correctable errors among said detected errors, and concealing uncorrectable errors among said detected errors;

wherein a time difference between said reproduced bit rate reduction encoded digital video signal and said reproduced digital audio signal at the time-division multiplexing step is the same as a time difference between an original video signal from which said recorded bit rate reduction encoded digital video signal was produced and an original audio signal from which said recorded digital audio signal was produced;

wherein a time difference between said reproduced bit rate reduction encoded digital video signal and said reproduced digital audio signal in said transmission signal in the transmitting step is the same as a time difference between an original video signal from which said recorded bit rate reduction encoded digital video signal was produced and an original audio signal from which said recorded digital audio signal was produced;

wherein the time-division multiplexing step includes multiplexing said reproduced bit rate reduction encoded digital video signal, said reproduced digital audio signal and said additional information signal so that said additional information signal is included as is in said transmission signal;

wherein said additional information signal includes an editing number code indicating a number of editings previously made, wherein said method further comprises the steps of decoding said reproduced bit rate reduction encoded digital video signal reproduced from said recording medium to obtain a decoded video signal, editing said decoded video signal to obtain an edited video signal and incrementing said editing number code by one to obtain a new editing number code, and bit rate reduction encoding said edited video signal to obtain a bit rate reduction encoded edited digital video signal, said bit rate reduction encoded edited digital video signal being time-division multiplexed with said additional information including said new editing number code, and wherein said recording step at said first apparatus records said new editing number code as is on said another recording medium;

wherein said recorded digital audio signal is a bit rate reduction encoded digital audio signal, wherein said method further comprises the steps of:

decoding said reproduced digital audio signal reproduced from said recording medium to obtain a decoded audio signal;

editing said decoded audio signal to obtain an edited audio signal and incrementing said editing number code by one to obtain a new editing number code; and bit rate reduction encoding said edited audio signal to obtain a bit rate reduction encoded edited digital audio signal, said bit rate reduction encoded edited digital audio signal being time-division multiplexed with said additional information signal including said new editing number code, and wherein said recording step at said first apparatus records said new editing number code as is on said another recording medium.

3. A method according to claim 2, wherein said editing number code is separated into a video editing number code for video signal channel and an audio editing number code for audio signal channel, and wherein each of said video editing number code and said audio editing number code is processed independently of the other.

4. A method of transmitting digital signals between a first apparatus having a function of recording a bit rate reduction encoded digital video signal and a digital audio signal on a recording medium and a second apparatus having a function of reproducing from a recording medium a recorded bit rate reduction encoded digital video signal, a recorded digital audio signal and a recorded additional information signal containing information concerning the recorded bit rate reduction encoded digital video signal and information concerning the recorded digital audio signal, said method comprising the steps of:

reproducing a recorded bit rate reduction coded video signal, a recorded digital audio signal and a recorded additional information signal from a recording medium at said second apparatus to obtain a reproduced bit rate reduction coded digital video signal,.a reproduced digital audio signal and a reproduced additional information signal, respectively;

time-division multiplexing the reproduced digital audio signal with the reproduced bit rate reduction coded digital video signal and with the reproduced additional information signal at said second .apparatus to obtain a multiplexed transmission signal;

transmitting said transmission signal from said second apparatus;

receiving at said first apparatus said transmission signal transmitted from said second apparatus;

separating the received transmission signal at said first apparatus into said reproduced bit rate reduction coded digital video signal, said reproduced digital audio signal and said reproduced additional information signal; and recording at said first apparatus said reproduced bit rate reduction coded digital video signal, said reproduced digital audio signal and said reproduced additional information signal which have been separated by the separating step on another recording medium;

wherein said method further comprises, between the reproducing step and the transmitting step, the steps of detecting errors contained in said reproduced bit rate reduction encoded digital video signal and said reproduced digital audio signal to obtain detected errors, correcting correctable errors among said detected errors, and concealing uncorrectable errors among said detected errors;

wherein a time difference between said reproduced bit rate reduction encoded digital video signal and said reproduced digital audio signal at the time-division multiplexing step is the same as a time difference between an original video signal from which said recorded bit rate reduction encoded digital video signal was produced and an original audio signal from which said recorded digital audio signal was produced;

wherein a time difference between said reproduced bit rate reduction encoded digital video signal and said reproduced digital audio signal in said transmission signal in the transmitting step is the same as a time difference between an original video signal from which said recorded bit rate reduction encoded digital video signal was produced and an original audio signal from which said recorded digital audio signal was produced;

wherein the time-division multiplexing step includes multiplexing said reproduced bit rate reduction encoded digital video signal, said reproduced digital audio signal and said additional information signal so that said additional information signal is included as is in said transmission signal;

wherein said reproducing step reproduces a plurality of recorded bit rate reduction coded video signals and a plurality of recorded digital audio signals from a plurality of recording mediums to obtain a plurality of reproduced bit rate reduction coded digital video signals, a plurality of reproduced digital audio signals and a plurality of additional information signals, wherein each of said plurality of additional information signals includes a copy number code indicating a number of copies previously made and an editing number code indicating a number of editings previously made, wherein said method further comprises the steps of:

decoding each of said plurality of reproduced bit rate reduction encoded digital video signals to obtain a plurality of decoded video signals;

editing said plurality of decoded video signals to obtain an edited video signal, including the steps of selecting a maximum copy number code among copy number codes in said plurality of additional information signals, selecting a maximum editing number code among editing number codes in said plurality of additional information signals, and incrementing said maximum editing number code by one to obtain a new editing number code;

bit rate reduction encoding said edited video signal to obtain a bit rate reduction encoded edited digital video signal, said bit rate reduction encoded edited digital video signal being time-division multiplexed with an additional information signal including said maximum copy number code and said new editing number code; and incrementing said maximum copy number code by one at said first apparatus to obtain a new copy number code, and wherein said recording step at said first apparatus records each of said new copy number code and said new editing number code as is on said another recording medium.

5. A method according to claim 4, wherein each of said plurality of reproduced digital audio signals is a bit rate reduction encoded digital audio signal, wherein said method further comprises the steps of:

decoding each of said plurality of reproduced digital audio signals to obtain a plurality of decoded audio signals;

editing said plurality of decoded audio signals to obtain an edited audio signal, including the steps of selecting a maximum editing number code among editing number codes in said plurality of additional information signals, and incrementing said maximum editing number code by one to obtain a new editing number code; and bit rate reduction encoding said edited audio signal to obtain a bit rate reduction encoded edited digital audio signal, said bit rate reduction encoded edited digital audio signal being time-division multiplexed with said additional information signal including said new editing number code, and wherein said recording step at said first apparatus records said new editing number code as is on said another recording medium.

6. A method according to claim 5, wherein each of said copy number code and said editing number code is separated into a code for video signal channel and a code for audio signal channel, and wherein each of said code for video signal channel and said code for audio signal channel is processed independently of the other.

7. A method of transmitting digital signals between a first apparatus having a function of recording a bit rate reduction encoded digital video signal and a digital audio signal on a recording medium and a second apparatus having a function of reproducing from a recording medium a recorded bit rate reduction encoded digital video signal, a recorded digital audio signal and a recorded additional information signal containing information concerning the recorded bit rate reduction encoded digital video signal and information concerning the recorded digital audio signal, said method comprising the steps of:

reproducing a recorded bit rate reduction coded video signal, a recorded digital audio signal and a recorded additional information signal from a recording medium at said second apparatus to obtain a reproduced bit rate reduction coded digital video signal, a reproduced digital audio signal and a reproduced additional information signal, respectively;

time-division multiplexing the reproduced digital audio signal with the reproduced bit rate reduction coded digital video signal and with the reproduced additional information signal at said second apparatus to obtain a multiplexed transmission signal;

transmitting said transmission signal from said second apparatus;

receiving at said first apparatus said transmission signal transmitted from said second apparatus;

separating the received transmission signal at said first apparatus into said reproduced bit rate reduction coded digital video signal, said reproduced digital audio signal and said reproduced additional information signal; and recording at said first apparatus said reproduced bit rate reduction coded digital video signal, said reproduced digital audio signal and said reproduced additional information signal which have been separated by the separating step on another recording medium;

wherein said method further comprises, between the reproducing step and the transmitting step, the steps of detecting errors contained in said reproduced bit rate reduction encoded digital video signal and said reproduced digital audio signal to obtain detected errors, correcting correctable errors among said detected errors, and concealing uncorrectable errors among said detected errors;

wherein a time difference between said reproduced bit rate reduction encoded digital video signal and said reproduced digital audio signal at the time-division multiplexing step is the same as a time difference between an original video signal from which said recorded bit rate reduction encoded digital video signal was produced and an original audio signal from which said recorded digital audio signal was produced;

wherein a time difference between said reproduced bit rate reduction encoded digital video signal and said reproduced digital audio signal in said transmission signal in the transmitting step is the same as a time difference between an original video signal from which said recorded bit rate reduction encoded digital video signal was produced and an original audio signal from which said recorded digital audio signal was produced;

wherein the time-division multiplexing step includes multiplexing said reproduced bit rate reduction encoded digital video signal, said reproduced digital audio signal and said additional information signal so that said additional information signal is included as is in said transmission signal; and wherein said reproducing step reproduces a plurality of recorded video signals including a bit rate reduction coded video signal and a non-encoded analog or digital video signal which has not been bit rate reduction encoded from a plurality of recorded mediums to obtain a plurality of reproduced video signals including a reproduced bit rate reduction coded digital video signal and a reproduced non-encoded analog or digital video signal, wherein said additional information signal includes a copy number code indicating a number of copies previously made and an editing number code indicating a number of editings previously made, and wherein said method further comprises a step of setting 0 to said copy number code and said editing number code of an additional information signal for said reproduced non-encoded analog or digital video signal.

8. A method according to claim 7, wherein said recorded digital audio signals is a bit rate reduction encoded digital audio signal, wherein said method further comprises the steps of:

decoding said reproduced digital audio signal reproduced from said recording medium to obtain a decoded audio signal;

editing said decoded audio signals to obtain an edited audio signal and incrementing said editing number code by one to obtain a new editing number code; and bit rate reduction encoding said edited audio signal to obtain a bit rate reduction encoded edited digital audio signal, said bit rate reduction encoded edited digital audio signal being time-division multiplexed with said additional information signal including said new editing number code, and wherein said recording step at said first apparatus records said new editing number code as is on said another recording medium.

9. A method according to claim 8, wherein each of said copy number code and said editing number code is separated into a code for video signal channel and a code for audio signal channel, and wherein each of said code for video signal channel and said code for audio signal channel is processed independently of the other.

10. A method of transmitting digital signals between a first apparatus having a function of recording a bit rate reduction encoded digital video signal and a digital audio signal on a recording medium and a second apparatus having a function of reproducing from a recording medium a recorded bit rate reduction encoded digital video signal, a recorded digital audio signal and a recorded additional information signal containing information concerning the recorded bit rate reduction encoded digital video signal and information concerning the recorded digital audio signal, said method comprising the steps of:

reproducing a recorded bit rate reduction coded video signal, a recorded digital audio signal and a recorded additional information signal from a recording medium at said second apparatus to obtain a reproduced bit rate reduction coded digital video signal, a reproduced digital audio signal and a reproduction additional information signal, respectively;

time-division multiplexing the reproduced digital audio signal with the reproduced bit rate reduction coded digital video signal and with the reproduced additional information signal at said second apparatus to obtain a multiplexed transmission signal;

transmitting said transmission signal from said second apparatus;

receiving at said first apparatus said transmission signal transmitted from said second apparatus;

separating the received transmission signal at said first apparatus into said reproduced bit rate reduction coded digital video signal, said reproduced digital audio signal and said reproduced additional information signal; and recording at said first apparatus said reproduced bit rate reduction coded digital video signal, said reproduced digital audio signal and said reproduced additional information signal which have been separated by the separating step on another recording medium;

wherein said method further comprises, between the reproducing step and the transmitting step, the steps of detecting errors contained in said reproduced bit rate reduction encoded digital video signal and said reproduced digital audio signal to obtain detected errors, correcting correctable errors among said detected errors, and concealing uncorrectable errors among said detected errors;

wherein a time difference between said reproduced bit rate reduction encoded digital video signal and said reproduced digital audio signal at the time-division multiplexing step is the same as a time difference between an original video signal from which said recorded bit rate reduction encoded digital video signal was produced and an original audio signal from which said recorded digital audio signal was produced;

wherein said recorded bit rate reduction encoded digital video signal and said recorded digital audio signal include an additional information signal concerning said recorded bit rate reduction encoded digital video signal and said recorded digital audio signal, and wherein the time-division multiplexing step includes multiplexing said reproduced bit rate reduction encoded digital video signal and said reproduced digital audio signal which include said additional information signal so that said additional information signal is included as is in said transmission signal;

wherein said additional information signal includes a copy number code indicating a number of copies previously made and an editing number code indicating a number of editings previously made, wherein said method further comprises the steps of extracting at said first apparatus said copy number code and said editing number code from the received transmission signal, and incrementing the extracted copy number code by one to obtain a new copy number code, and wherein said recording step records the extracted editing number code as is and said new copy number code on said another recording medium; and wherein each of said copy number code and said editing number code is separated into a code for video signal channel and a code for audio signal channel, and wherein each of said code for video signal channel and said code for audio signal channel is processed independently of the other.

11. A method according to claim 10, wherein said additional information signal includes an editing number code indicating a number of editings previously made, wherein said method further comprises the steps of:

decoding said reproduced bit rate reduction encoded digital video signal reproduced from said recording medium to obtain a decoded video signal;

editing said decoded video signal to obtain an edited video signal and incrementing said editing number code by one to obtain a new editing number code; and bit rate reduction encoding said edited video signal to obtain a bit rate reduction encoded edited digital video signal, said bit rate reduction encoded edited digital video signal being time-division multiplexed with said additional information including said new editing number code, and wherein said recording step at said first apparatus records said new editing number code as is on said another recording medium.

12. A method according to claim 11, wherein said recorded digital audio signal is a bit rate reduction encoded digital audio signal, wherein said method further comprises the steps of:

decoding said reproduced digital audio signal reproduced from said recording medium to obtain a decoded audio signal;

editing said decoded audio signal to obtain an edited audio signal and incrementing said editing number code by one to obtain a new editing number code; and bit rate reduction encoding said edited audio signal to obtain a bit rate reduction encoded edited digital audio signal, said bit rate reduction encoded edited digital audio signal being time-division multiplexed with said additional information signal including said new editing number code, and wherein said recording step at said first apparatus records said new editing number code as is on said another recording medium.

13. A method according to claim 12, wherein said editing number code is separated into a video editing number code for video signal channel and an audio editing number code for audio signal channel, and wherein each of said video editing number code and said audio editing number code is processed independently of the other.

14. A method of transmitting digital signals between a first apparatus having a function of recording a bit rate reduction encoded digital video signal and a digital audio signal on a recording medium and a second apparatus having a function of reproducing from a recording medium a recorded bit rate reduction encoded digital video signal, a recorded digital audio signal and a recorded additional information signal containing information concerning the recorded bit rate reduction encoded digital video signal and information concerning the recorded digital audio signal, said method comprising the steps of:

reproducing a recorded bit rate reduction coded video signal, a recorded digital audio signal and a recorded additional information signal from a recording medium at said second apparatus to obtain a reproduced bit rate reduction coded digital video signal, a reproduced digital audio signal and a reproduced additional information signal, respectively;

time-division multiplexing the reproduced digital audio signal with the reproduced bit rate reduction coded digital video signal and with the reproduced additional information signal at said second apparatus to obtain a multiplexed transmission signal;

transmitting Said transmission signal from said second apparatus;

receiving at said first apparatus said transmission signal transmitted from said second apparatus;

separating the received transmission signal at said first apparatus into said reproduced bit rate reduction coded digital video signal, said reproduced digital audio signal and said reproduced additional information signal; and recording at said first apparatus said reproduced bit rate reduction coded digital video signal, said reproduced digital audio signal and said reproduced additional information signal which have been separated by the separating step on another recording medium;

wherein said method further comprises, between the reproducing step and the transmitting step, the steps of detecting errors contained in said reproduced bit rate reduction encoded digital video signal and said reproduced digital audio signal to obtain detected errors, correcting correctable errors among said detected errors, and concealing uncorrectable errors among said detected errors;

wherein a time difference between said reproduced bit rate reduction encoded digital video signal and said reproduced digital audio signal at the time-division multiplexing step is the same as a time difference between an original video signal from which said recorded bit rate reduction encoded digital video signal was produced and an original audio signal from which said recorded digital audio signal was produced:

wherein said recorded bit rate reduction encoded digital video signal and said recorded digital audio signal include an additional information signal concerning said recorded bit rate reduction encoded digital video signal and said recorded digital audio signal, and wherein the time-division multiplexing step includes multiplexing said reproduced bit rate reduction encoded digital video signal and said reproduced digital audio signal which include said additional information signal so that said additional information signal is included as is in said transmission signal;

wherein said additional information signal includes a copy number code indicating a number of copies previously made and an editing number code indicating a number of editings previously made, wherein said method further comprises the steps of extracting at said first apparatus said copy number code and said editing number code from the received transmission signal, and incrementing the extracted copy number code by one to obtain a new copy number code, and wherein said recording step records the extracted editing number code as is and said new copy number code on said another recording medium;

wherein said reproducing step reproduces a plurality of recorded bit rate reduction coded video signals and a plurality of recorded digital audio signals from a plurality of recording mediums to obtain a plurality of reproduced bit rate reduction coded digital video signals, a plurality of reproduced digital audio signals and a plurality of additional information signals, wherein each of said plurality of additional information signals includes a copy number code indicating a number of copies previously made and an editing number code indicating a number of editings previously made, wherein said method further comprises the steps of:

decoding each of said plurality of reproduced bit rate reduction encoded digital video signals to obtain a plurality of decoded video signals;

editing said plurality of decoded video signals to obtain an edited video signal, including the steps of selecting a maximum copy number code among copy number codes in said plurality of additional information signals, selecting a maximum editing number code among editing number codes in said plurality of additional information signals, and incrementing said maximum editing number code by one to obtain a new editing number code;

bit rate reduction encoding said edited video signal to obtain a bit rate reduction encoded edited digital video signal, said bit rate reduction encoded edited digital video signal being time-division multiplexed with an additional information signal including said maximum copy number code and said new editing number code; and incrementing said maximum copy number code by one at said first apparatus to obtain a new copy number code, and wherein said recording step at said first apparatus records each of said new copy number code and said new editing number code as is on said another recording medium.

15. A method according to claim 14, wherein each of said plurality of reproduced digital audio signals is a bit rate reduction encoded digital audio signal, wherein said method further comprises the steps of:

decoding each of said plurality of reproduced digital audio signals to obtain a plurality of decoded audio signals;

editing said plurality of decoded audio signals to obtain an edited audio signal, including the steps of selecting a maximum editing number code among editing number codes in said plurality of additional information signals, and incrementing said maximum editing number code by one to obtain a new editing number code; and bit rate reduction encoding said edited audio signal to obtain a bit rate reduction encoded edited digital audio signal, said bit rate reduction encoded edited digital audio signal being time-division multiplexed with said additional information signal including said new editing number code, and wherein said recording step at said first apparatus records said new editing number code as is on said another recording medium.

16. A method according to claim 15, wherein each of said copy number code and said editing number code is separated into a code for video signal channel and a code for audio signal channel, and wherein each of said code for video signal channel and said code for audio signal channel is processed independently of the other.

17. A method of transmitting digital signals between a first apparatus having a function of recording a bit rate reduction encoded digital video signal and a digital audio signal on a recording medium and a second apparatus having a function of reproducing from a recording medium a recorded bit rate reduction encoded digital video signal, a recorded digital audio signal and a recorded additional information signal containing information concerning the recorded bit rate reduction encoded digital video signal and information concerning the recorded digital audio signal, said method comprising the steps of:

reproducing a recorded bit rate reduction coded video signal, a recorded digital audio signal and a recorded additional information signal from a recording medium at said second apparatus to obtain a reproduced bit rate reduction coded digital video signal, a reproduced digital audio signal and a reproduced additional information signal, respectively;

time-division multiplexing the reproduced digital audio signal with the reproduced bit rate reduction coded digital video signal and with the reproduced additional information signal at said second apparatus to obtain a multiplexed transmission signal;

transmitting said transmission signal from said second apparatus;

receiving at said first apparatus said transmission signal transmitted from said second apparatus;

separating the received transmission signal at said first apparatus into said reproduced bit rate reduction coded digital video signal, said reproduced digital audio signal and said reproduced additional information signal; and recording at said first apparatus said reproduced bit rate reduction coded digital video signal, said reproduced digital audio signal and said reproduced additional information signal which have been separated by the separating step on another recording medium;

wherein said method further comprises, between the reproducing step and the transmitting step, the steps of detecting errors contained in said reproduced bit rate reduction encoded digital video signal and said reproduced digital audio signal to obtain detected errors, correcting correctable errors among said detected errors, and concealing uncorrectable errors among said detected errors;

wherein a time difference between said reproduced bit rate reduction encoded digital video signal and said reproduced digital audio signal at the time-division multiplexing step is the same as a time difference between an original video sign.al from which said recorded bit rate reduction encoded digital video Signal was produced and an original audio signal from which said recorded digital audio signal was produced;

wherein said recorded bit rate reduction encoded digital video signal and said recorded digital audio signal include an additional information signal concerning said recorded bit rate reduction encoded digital video signal and said recorded digital audio signal, and wherein the time-division multiplexing Step includes multiplexing said reproduced bit rate reduction encoded digital video signal and said reproduced digital audio signal which include said additional information signal so that said additional information signal is included as is in said transmission signal;

wherein said additional information signal includes a copy number code indicating a number of copies previously made and an editing number code indicating a number of editings previously made, wherein said method further comprises the steps of extracting at said first apparatus said copy number code and said editing number code from the received transmission signal, and incrementing the extracted copy number code by one to obtain a new copy number code, and wherein said recording step records the extracted editing number code as is and said new copy number code on said another recording medium; and wherein said reproducing step reproduces a plurality of recorded video signals including a bit rate reduction coded video signal and a non-encoded analog or digital video signal which has not been bit rate reduction encoded from a plurality of recorded mediums to obtain a plurality of reproduced video signals including a reproduced bit rate reduction coded digital video signal and a reproduced non-encoded analog or digital video signal, wherein said additional information signal includes a copy number code indicating a number of copies previously made and an editing number code indicating a number of editings previously made, and wherein said method further comprises a step of setting 0 to said copy number code and said editing number code of an additional information signal for said reproduced non-encoded analog or digital video signal.

18. A method according to claim 17, wherein said recorded digital audio signal is a bit rate reduction encoded digital audio signal, wherein said method further comprises the steps of:

decoding said reproduced digital audio signal reproduced from said recording medium to obtain a decoded audio signal;

editing said decoded audio signal to obtain an edited audio signal and incrementing said editing number code by one to obtain a new editing number code; and bit rate reduction encoding said edited audio signal to obtain a bit rate reduction encoded edited digital audio signal, said bit rate reduction encoded edited digital audio signal being time-division multiplexed with said additional information signal including said new editing number code, and wherein said recording step at said first apparatus records said new editing number code as is on said another recording medium.

19. A method according to claim 18, wherein each of said copy number code and said editing number code is separated into a code for video signal channel and a code for audio signal channel, and wherein each of said code for video signal channel and said code for audio signal channel is processed independently of the other.

20. A method of transmitting digital signals between a first apparatus having a function of recording a bit rate reduction encoded digital video signal and a digital audio signal on a recording medium and a second apparatus having a function of reproducing from a recording medium a recorded bit rate reduction encoded digital video signal and a recorded digital audio signal, said method comprising the steps of:

reproducing a recorded bit rate reduction coded video signal and a recorded digital audio signal from a recording medium at said second apparatus to obtain a reproduced bit rate reduction coded digital video signal and a reproduced digital audio signal, respectively;

time-division multiplexing the reproduced digital audio signal with the reproduced bit rate reduction coded digital video signal at said second apparatus to obtain a multiplexed transmission signal;

transmitting said transmission signal from said second apparatus;

receiving at said first apparatus said transmission signal transmitted from said second apparatus;

separating the received transmission signal at said first apparatus into said reproduced bit rate reduction coded digital video signal and said reproduced digital audio signal; and recording at said first apparatus said reproduced bit rate reduction coded digital video signal and said reproduced digital audio signal which have been separated by the separating step on another recording medium;

wherein said method further comprises, between the reproducing step and the transmitting step, the steps of detecting errors contained in said reproduced bit rate reduction encoded digital video signal and said reproduced digital audio signal to obtain detected errors, correcting correctable errors among said detected errors, and concealing uncorrectable errors among said detected errors;

wherein a time difference between said reproduced bit rate reduction encoded digital video signal and said reproduced digital audio signal at the time-division multiplexing step is the same as a time difference between an original video signal from which said recorded bit rate reduction encoded digital video signal was produced and an original audio signal from which said recorded digital audio signal was produced;

wherein a time difference between said reproduced bit rate reduction encoded digital video signal and said reproduced digital audio signal in said transmission signal in the transmitting step is the same as a time difference between an original video signal from which said recorded bit rate reduction encoded digital video signal was produced and an original audio signal from which said recorded digital audio signal was produced;

wherein said recorded bit rate reduction encoded digital video signal and said recorded digital audio signal include an additional information signal concerning said recorded bit rate reduction encoded digital video signal and said recorded digital audio signal, and wherein the time-division multiplexing step includes multiplexing said reproduced bit rate reduction encoded digital video signal and said reproduced digital audio signal which include said additional information signal so that said additional information signal is included as is in said transmission signal;

wherein said additional information signal includes a copy number code indicating a number of copies previously made and an editing number code indicating a number of editings previously made, and wherein said method further comprises the steps of extracting at said first apparatus said copy number code and said editing number code from the received transmission signal, and incrementing the extracted copy number code by one to obtain a new copy number code, and wherein said recording step records the extracted editing number code as is and said new copy number code on said another recording medium; and, wherein each of said copy number code and said editing number code is separated into a code for video signal channel and a code for audio signal channel, and wherein each of said code for video signal channel and said code for audio signal channel is processed independently of the other.

21. A method of transmitting digital signals between a first apparatus having a function of recording a bit rate reduction encoded digital video signal and a digital audio signal on a recording medium and a second apparatus having a function of reproducing from a recording medium a recorded bit rate reduction encoded digital video signal and a recorded digital audio signal, said method comprising the steps of:

reproducing a recorded bit rate reduction coded video signal and a recorded digital audio signal from a recording medium at said second apparatus to obtain a reproduced bit rate reduction coded digital video signal and a reproduced digital audio signal, respectively;

time-division multiplexing the reproduced digital audio signal with the reproduced bit rate reduction coded digital video signal at said second apparatus to obtain a multiplexed transmission signal;

transmitting said transmission signal from said second apparatus;

receiving at said first apparatus said transmission signal transmitted from said second apparatus;

separating the received transmission signal at said first apparatus into said reproduced bit rate reduction coded digital video signal and said reproduced digital audio signal; and recording at said first apparatus said reproduced bit rate reduction coded digital video signal and said reproduced digital audio signal which have been separated by the separating step on another recording medium;

wherein said method further comprises, between the reproducing step and the transmitting step, the steps of detecting errors contained in said reproduced bit rate reduction encoded digital video signal and said reproduced digital audio signal to obtain detected errors, correcting correctable errors among said detected errors, and concealing uncorrectable errors among said detected errors;

wherein a time difference between said reproduced bit rate reduction encoded digital video signal and said reproduced digital audio signal at the time-division multiplexing step is the same as a time difference between an original video signal from which said recorded bit rate reduction encoded digital video signal was produced and an original audio signal from which said recorded digital audio signal was produced;

wherein a time difference between said reproduced bit rate reduction encoded digital video signal and said reproduced digital audio signal in said transmission signal in the transmitting step is the same as a time difference between an original video signal from which said recorded bit rate reduction encoded digital video signal was produced and an original audio signal from which said recorded digital audio signal was produced;

wherein said recorded bit rate reduction encoded digital video signal and said recorded digital audio signal include an additional information signal concerning said recorded bit rate reduction encoded digital video signal and said recorded digital audio signal, and wherein the time-division multiplexing step includes multiplexing said reproduced bit rate reduction encoded digital video signal and said reproduced digital audio signal which include said additional information signal so that said additional information signal is included as is in said transmission signal;

wherein said additional information signal includes an editing number code indicating a number of editings previously made, wherein said method further comprises the steps of decoding said reproduced bit rate reduction encoded digital video signal reproduced from said recording medium to obtain a decoded video signal, editing said decoded video signal to obtain an edited video signal and incrementing said editing number code by one to obtain a new editing number code, and bit rate reduction encoding said edited video signal to obtain a bit rate reduction encoded edited digital video signal, said bit rate reduction encoded edited digital video signal being time-division multiplexed with said additional information including said new editing number code, and wherein said recording step at said first apparatus records said new editing number code as is on said another recording medium;

wherein said recorded digital audio signal is a bit rate reduction encoded digital audio signal, wherein said method further comprises the steps of decoding said reproduced digital audio signal reproduced from said recording medium to obtain a decoded audio signal, editing said decoded audio signal to obtain an edited audio signal and incrementing said editing number code by one to obtain a new editing number code, and bit rate reduction encoding said edited audio signal to obtain a bit rate reduction encoded edited digital audio signal, said bit rate reduction encoded edited digital audio signal being time-division multiplexed with said additional information signal including said new editing number code, and wherein said recording step at said first apparatus records said new editing number code as is on said another recording medium.

22. A method according to claim 21, wherein said editing number code is separated into a video editing number code for video signal channel and an audio editing number code for audio signal channel, and wherein each of said video editing number code and said audio editing number code is processed independently of the other.

23. A method of transmitting digital signals between a first apparatus having a function of recording a bit rate reduction encoded digital video signal and a digital audio signal on a recording medium and a second apparatus having a function of reproducing from a recording medium a recorded bit rate reduction encoded digital video signal and a recorded digital audio signal, said method comprising the steps of:

reproducing a recorded bit rate reduction coded video signal and a recorded digital audio signal from a recording medium at said second apparatus to obtain a reproduced bit rate reduction coded digital video signal and a reproduced digital audio signal, respectively;

time-division multiplexing the reproduced digital audio signal with the reproduced bit rate reduction coded digital video signal at said second apparatus to obtain a multiplexed transmission signal;

transmitting said transmission signal from said second apparatus;

receiving at said first apparatus said transmission signal transmitted from said second apparatus;

separating the received transmission signal at said first apparatus into said reproduced bit rate reduction coded digital video signal and said reproduced digital audio signal; and recording at said first apparatus said reproduced bit rate reduction coded digital video signal and said reproduced digital audio signal which have been separated by the separating step on another recording medium;

wherein said method further comprises, between the reproducing step and the transmitting step, the steps of detecting errors contained in said reproduced bit rate reduction encoded digital video signal and said reproduced digital audio signal to obtain detected errors, correcting correctable errors among said detected errors, and concealing uncorrectable errors among said detected errors;

wherein a time difference between said reproduced bit rate reduction encoded digital video signal and said reproduced digital audio signal at the time-division multiplexing step is the same as a time difference between an original video signal from which said recorded bit rate reduction encoded digital video signal was produced and an original audio signal from which said recorded digital audio signal was produced;

wherein a time difference between said reproduced bit rate reduction encoded digital video signal and said reproduced digital audio signal in said transmission signal in the transmitting step is the same as a time difference between an original video signal from which said recorded bit rate reduction encoded digital video signal was produced and an original audio signal from which said recorded digital audio signal was produced;

wherein said recorded bit rate reduction encoded digital video signal and said recorded digital audio signal include an additional information signal concerning said recorded bit rate reduction encoded digital video signal and said recorded digital audio signal, and wherein the time-division multiplexing step includes multiplexing said reproduced bit rate reduction encoded digital video signal and said reproduced digital audio signal which include said additional information signal so that said additional information signal is included as is in said transmission signal;

wherein said reproducing step reproduces a plurality of recorded bit rate reduction coded video signals and a plurality of recorded digital audio signals from a plurality of recording mediums to obtain a plurality of reproduced bit rate reduction coded digital video signals, a plurality of reproduced digital audio signals and a plurality of additional information signals, wherein each of said plurality of additional information signals includes a copy number code indicating a number of copies previously made and an editing number code indicating a number of editings previously made, wherein said method further comprises the steps of:

decoding each of said plurality of reproduced bit rate reduction encoded digital video signals to obtain a plurality of decoded video signals;

editing said plurality of decoded video signals to obtain an edited video signal, including the steps of selecting a maximum copy number code among copy number codes in said plurality of additional information signals, selecting a maximum editing number code among editing number codes in said plurality of additional information signals, and incrementing said maximum editing number code by one to obtain a new editing number code;

bit rate reduction encoding said edited video signal to obtain a bit rate reduction encoded edited digital video signal, said bit rate reduction encoded edited digital video signal being time-division multiplexed with an additional information signal including said maximum copy number code and said new editing number code; and incrementing said maximum copy number code by one at said first apparatus to obtain a new copy number code, and wherein said recording step at said first apparatus records each of said new copy number code and said new editing number code as is on said another recording medium.

24. A method according to claim 23, wherein each of said plurality of reproduced digital audio signals is a bit rate reduction encoded digital audio signal, wherein said method further comprises the steps of:

decoding each of said plurality of reproduced digital audio signals to obtain a plurality of decoded audio signals;

editing said plurality of decoded audio signals to obtain an edited audio signal, including the steps of selecting a maximum editing number code among editing number codes in said plurality of additional information signals, and incrementing said maximum editing number code by one to obtain a new editing number code; and bit rate reduction encoding said edited audio signal to obtain a bit rate reduction encoded edited digital audio signal, said bit rate reduction encoded edited digital audio signal being time-division multiplexed with said additional information signal including said new editing number code, and wherein said recording step at said first apparatus records said new editing number code as is on said another recording medium.

25. A method according to claim 24, wherein each of said copy number code and said editing number code is separated into a code for video signal channel and a code for audio signal channel, and wherein each of said code for video signal channel and said code for audio signal channel is processed independently of the other.

26. A method of transmitting digital signals between a first apparatus having a function of recording a bit rate reduction encoded digital video signal and a digital audio signal on a recording medium and a second apparatus having a function of reproducing from a recording medium a recorded bit rate reduction encoded digital video signal and a recorded digital audio signal, said method comprising the steps of:

reproducing a recorded bit rate reduction coded video signal and a recorded digital audio signal from a recording medium at said second apparatus to obtain a reproduced bit rate reduction coded digital video signal and a reproduced digital audio signal, respectively;

time-division multiplexing the reproduced digital audio signal with the reproduced bit rate reduction coded digital video signal at said second apparatus to obtain a multiplexed transmission signal;

transmitting said transmission signal from said second apparatus;

receiving at said first apparatus said transmission signal transmitted from said second apparatus;

separating the received transmission signal at said first apparatus into said reproduced bit rate reduction coded digital video signal and said reproduced digital audio signal; and recording at said first apparatus said reproduced bit rate reduction coded digital video signal and said reproduced digital audio signal which have been separated by the separating step on another recording medium;

wherein said method further comprises, between the reproducing step and the transmitting step, the steps of detecting errors contained in said reproduced bit rate reduction encoded digital video signal and said reproduced digital audio signal to obtain detected errors, correcting correctable errors among said detected errors, and concealing uncorrectable errors among said detected errors;

wherein a time difference between said reproduced bit rate reduction encoded digital video signal and said reproduced digital audio signal at the time-division multiplexing step is the same as a time difference between an original video signal from which said recorded bit rate reduction encoded digital video signal was produced and an original audio signal from which said recorded digital audio signal was produced;

wherein a time difference between said reproduced bit rate reduction encoded digital video signal and said reproduced digital audio signal in said transmission signal in the transmitting step is the same as a time difference between an original video signal from which said recorded bit rate reduction encoded digital video signal was produced and an original audio signal from which said recorded digital audio signal was produced;

wherein said recorded bit rate reduction encoded digital video signal and said recorded digital audio signal include an additional information signal concerning said recorded bit rate reduction encoded digital video signal and said recorded digital audio signal, and wherein the time-division multiplexing step includes multiplexing said reproduced bit rate reduction encoded digital video signal and said reproduced digital audio signal which include said additional information signal so that said additional information signal is included as is in said transmission signal;

wherein said reproducing step reproduces a plurality of recorded video signals including a bit rate reduction coded video signal and a non-encoded analog or digital video signal which has not been bit rate reduction encoded from a plurality of recorded mediums to obtain a plurality of reproduced video signals including a reproduced bit rate reduction coded digital video signal and a reproduced non-encoded analog or digital video signal, wherein said additional information signal includes a copy number code indicating a number of copies previously made and an editing number code indicating a number of editings previously made, and wherein said method further comprises a step of setting 0 to said copy number code and said editing number code of an additional information signal for said reproduced non-encoded analog or digital video signal.

27. A method according to claim 26, wherein said recorded digital audio signals is a bit rate reduction encoded digital audio signal, wherein said method further comprises the steps of:

decoding said reproduced digital audio signal reproduced from said recording medium to obtain a decoded audio signal;

editing said decoded audio signals to obtain an edited audio signal and incrementing said editing number code by one to obtain a new editing number code; and bit rate reduction encoding said edited audio signal to obtain a bit rate reduction encoded edited digital audio signal, said bit rate reduction encoded edited digital audio signal being time-division multiplexed with said additional information signal including said new editing number code, and wherein said recording step at said first apparatus records said new editing number code as is on said another recording medium.

28. A method according to claim 27, wherein each of said copy number code and said editing number code is separated into a code for video signal channel and a code for audio signal channel, and wherein each of said code for video signal channel and said code for audio signal channel is processed independently of the other.

29. A method of transmitting digital signals between a first apparatus having a function of recording a bit rate reduction encoded digital video signal and a digital audio signal on a recording medium and a second apparatus having a function of reproducing from a recording medium a recorded bit rate reduction encoded digital video signal and a recorded digital audio signal, said method comprising the steps of:

reproducing a recorded bit rate reduction coded video signal and a recorded digital audio signal from a recording medium at said second apparatus to obtain a reproduced bit rate reduction coded digital video signal and a reproduced digital audio signal, respectively;

time-division multiplexing the reproduced digital audio signal with the reproduced bit rate reduction coded digital video signal at said second apparatus to obtain a multiplexed transmission signal;

transmitting said transmission signal from said second apparatus;

receiving at said first apparatus said transmission signal transmitted from said second apparatus;

separating the received transmission signal at said first apparatus into said reproduced bit rate reduction coded digital video signal and said reproduced digital audio signal; and recording at said first apparatus said reproduced bit rate reduction coded digital video signal and said reproduced digital audio signal which have been separated by the separating step on another recording medium;

wherein said method further comprises, between the reproducing step and the transmitting step, the steps of detecting errors contained in said reproduced bit rate reduction encoded digital video signal and said reproduced digital audio signal to obtain detected errors, correcting correctable errors among said detected errors, and concealing uncorrectable errors among said detected errors;

wherein a time difference between said reproduced bit rate reduction encoded digital video signal and said reproduced digital audio signal at the time-division multiplexing step is the same as a time difference between an original video signal from which said recorded bit rate reduction encoded digital video signal was produced and an original audio signal from which said recorded digital audio signal was produced;

wherein said recorded bit rate reduction encoded digital video signal and said recorded digital audio signal include an additional information signal concerning said recorded bit rate reduction encoded digital video signal and said recorded digital audio signal, and wherein the time-division multiplexing step includes multiplexing said reproduced bit rate reduction encoded digital video signal and said reproduced digital audio signal which include said additional information signal so that said additional information signal is included as is in said transmission signal;

wherein said additional information signal includes a copy number code indicating a number of copies previously made and an editing number code indicating a number of editings previously made, wherein said method further comprises the steps of extracting at said first apparatus said copy number code and said editing number code from the received transmission signal, and incrementing the extracted copy number code by one to obtain a new copy number code, and wherein said recording step records the extracted editing number code as is and said new copy number code on said another recording medium;

wherein each of said copy number code and said editing number code is separated into a code for video signal channel and a code for audio signal channel, and wherein each of said code for video signal channel and said code for audio signal channel is processed independently of the other.

30. A method according to claim 29, wherein said additional information signal includes an editing number code indicating a number of editings previously made, wherein said method further comprises the steps of:

decoding said reproduced bit rate reduction encoded digital video signal reproduced from said recording medium to obtain a decoded video signal;

editing said decoded video signal to obtain an edited video signal and incrementing said editing number code by one to obtain a new editing number code; and bit rate reduction encoding said edited video signal to obtain a bit rate reduction encoded edited digital video signal, said bit rate reduction encoded edited digital video signal being time-division multiplexed with said additional information including said new editing number code, and wherein said recording step at said first apparatus records said new editing number code as is on said another recording medium.

31. A method according to claim 30, wherein said recorded digital audio signal is a bit rate reduction encoded digital audio signal, wherein said method further comprises the steps of:

decoding said reproduced digital audio signal reproduced from said recording medium to obtain a decoded audio signal;

editing said decoded audio signal to obtain an edited audio signal and incrementing said editing number code by one to obtain a new editing number code; and bit rate reduction encoding said edited audio signal to obtain a bit rate reduction encoded edited digital audio signal, said bit rate reduction encoded edited digital audio signal being time-division multiplexed with said additional information signal including said new editing number code, and wherein said recording step at said first apparatus records said new editing number code as is on said another recording medium.

32. A method according to claim 31, wherein said editing number code is separated into a video editing number code for video signal channel and an audio editing number code for audio signal channel, and wherein each of said video editing number code and said audio editing number code is processed independently of the other.

33. A method of transmitting digital signals between a first apparatus having a function of recording a bit rate reduction encoded digital video signal and a digital audio signal on a recording medium and a second apparatus having a function of reproducing from a recording medium a recorded bit rate reduction encoded digital video signal and a recorded digital audio signal, said method comprising the steps of:

reproducing a recorded bit rate reduction coded video signal and a recorded digital audio signal from a recording medium at said second apparatus to obtain a reproduced bit rate reduction coded digital video signal and a reproduced digital audio signal, respectively;

time-division multiplexing the reproduced digital audio signal with the reproduced bit rate reduction coded digital video signal at said second apparatus to obtain a multiplexed transmission signal;

transmitting said transmission signal from said second apparatus;

receiving at said first apparatus said transmission signal transmitted from said second apparatus;

separating the received transmission signal at said first apparatus into said reproduced bit rate reduction coded digital video signal and said reproduced digital audio signal; and recording at said first apparatus said reproduced bit rate reduction coded digital video signal and said reproduced digital audio signal which have been separated by the separating step on another recording medium;

wherein said method further comprises, between the reproducing step and the transmitting step, the steps of detecting errors contained in said reproduced bit rate reduction encoded digital video signal and said reproduced digital audio signal to obtain detected errors, correcting correctable errors among said detected errors, and concealing uncorrectable errors among said detected errors;

wherein a time difference between said reproduced bit rate reduction encoded digital video signal and said reproduced digital audio signal at the time-division multiplexing step is the same as a time difference between an original video signal from which said recorded bit rate reduction encoded digital video signal was produced and an original audio signal from which said recorded digital audio signal was produced;

wherein said recorded bit rate reduction encoded digital video signal and said recorded digital audio signal include an additional information signal concerning said recorded bit rate reduction encoded digital video signal and said recorded digital audio signal, and wherein the time-division multiplexing step includes multiplexing said reproduced bit rate reduction encoded digital video signal and said reproduced digital audio signal which include said additional information signal so that said additional information signal is included as is in said transmission signal;

wherein said additional information signal includes a copy number code indicating a number of copies previously made and an editing number code indicating a number of editings previously made, wherein said method further comprises the steps of extracting at said first apparatus said copy number code and said editing number code from the received transmission signal, and incrementing the extracted copy number code by one to obtain a new copy number code, and wherein said recording step records the extracted editing number code as is and said new copy number code on said another recording medium;

wherein said reproducing step reproduces a plurality of recorded bit rate reduction coded video signals and a plurality of recorded digital audio signals from a plurality of recording mediums to obtain a plurality of reproduced bit rate reduction coded digital video signals, a plurality of reproduced digital audio signals and a plurality of additional information signals, wherein each of said plurality of additional information signals includes a copy number code indicating a number of copies previously made and an editing number code indicating a number of editings previously made, wherein said method further comprises the steps of:

decoding each of said plurality of reproduced bit rate reduction encoded digital video signals to obtain a plurality of decoded video signals;

editing said plurality of decoded video signals to obtain an edited video signal, including the steps of selecting a maximum copy number code among copy number codes in said plurality of additional information signals, selecting a maximum editing number code among editing number codes in said plurality of additional information signals, and incrementing said maximum editing number code by one to obtain a new editing number code;

bit rate reduction encoding said edited video signal to obtain a bit rate reduction encoded edited digital video signal, said bit rate reduction encoded edited digital video signal being time-division multiplexed with an additional information signal including said maximum copy number code and said new editing number code; and incrementing said maximum copy number code by one at said first apparatus to obtain a new copy number code, and wherein said recording step at said first apparatus records each of said new copy number code and said new editing number code as is on said another recording medium.

34. A method according to claim 33, wherein each of said plurality of reproduced digital audio signals is a bit rate reduction encoded digital audio signal, wherein said method further comprises the steps of:

decoding each of said plurality of reproduced digital audio signals to obtain a plurality of decoded audio signals;

editing said plurality of decoded audio signals to obtain an edited audio signal, including the steps of selecting a maximum editing number code among editing number codes in said plurality of additional information signals, and incrementing said maximum editing number code by one to obtain a new editing number code; and bit rate reduction encoding said edited audio signal to obtain a bit rate reduction encoded edited digital audio signal, said bit rate reduction encoded edited digital audio signal being time-division multiplexed with said additional information signal including said new editing number code, and wherein said recording step at said first apparatus records said new editing number code as is on said another recording medium.

35. A method according to claim 34, wherein each of said copy number code and said editing number code is separated into a code for video signal channel and a code for audio signal channel, and wherein each of said code for video signal channel and said code for audio signal channel is processed independently of the other.

36. A method of transmitting digital signals between a first apparatus having a function of recording a bit rate reduction encoded digital video signal and a digital audio signal on a recording medium and a second apparatus having a function of reproducing from a recording medium a recorded bit rate reduction encoded digital video signal and a recorded digital audio signal, said method comprising the steps of:

reproducing a recorded bit rate reduction coded video signal and a recorded digital audio signal from a recording medium at said second apparatus to obtain a reproduced bit rate reduction coded digital video signal and a reproduced digital audio signal, respectively;

time-division multiplexing the reproduced digital audio signal with the reproduced bit rate reduction coded digital video signal at said second apparatus to obtain a multiplexed transmission signal;

transmitting said transmission signal from said second apparatus;

receiving at said first apparatus said transmission signal transmitted from said second apparatus;

separating the received transmission signal at said first apparatus into said reproduced bit rate reduction coded digital video signal and said reproduced digital audio signal; and recording at said first apparatus said reproduced bit rate reduction coded digital video signal and said reproduced digital audio signal which have been separated by the separating step on another recording medium;

wherein said method further comprises, between the reproducing step and the transmitting step, the steps of detecting errors contained in said reproduced bit rate reduction encoded digital video signal and said reproduced digital audio signal to obtain detected errors, correcting correctable errors among said detected errors, and concealing uncorrectable errors among said detected errors;

wherein a time difference between said reproduced bit rate reduction encoded digital video signal and said reproduced digital audio signal at the time-division multiplexing step is the same as a time difference between an original video signal from which said recorded bit rate reduction encoded digital video signal was produced and an original audio signal from which said recorded digital audio signal was produced;

wherein said recorded bit rate reduction encoded digital video signal and said recorded digital audio signal include an additional information signal concerning said recorded bit rate reduction encoded digital video signal and said recorded digital audio signal, and wherein the time-division multiplexing step includes multiplexing said reproduced bit rate reduction encoded digital video signal and said reproduced digital audio signal which include said additional information signal so that said additional information signal is included as is in said transmission signal;

wherein said additional information signal includes a copy number code indicating a number of copies previously made and an editing number code indicating a number of editings previously made, wherein said method further comprises the steps of extracting at said first apparatus said copy number code and said editing number code from the received transmission signal, and incrementing the extracted copy number code by one to obtain a new copy number code, and wherein said recording step records the extracted editing number code as is and said new copy number code on said another recording medium;

wherein said reproducing step reproduces a plurality of recorded video signals including a bit rate reduction coded video signal and a non-encoded analog or digital video signal which has not been bit rate reduction encoded from a plurality of recorded mediums to obtain a plurality of reproduced video signals including a reproduced bit rate reduction coded digital video signal and a reproduced non-encoded analog or digital video signal, wherein said additional information signal includes a copy number code indicating a number of copies previously made and an editing number code indicating a number of editings previously made, and wherein said method further comprises a step of setting 0 to said copy number code and said editing number code of an additional information signal for said reproduced non-encoded analog or digital video signal.

37. A method according to claim 36, wherein said recorded digital audio signal is a bit rate reduction encoded digital audio signal, wherein said method further comprises the steps of:

decoding said reproduced digital audio signal reproduced from said recording medium to obtain a decoded audio signal;

editing said decoded audio signal to obtain an edited audio signal and incrementing said editing number code by one to obtain a new editing number code; and bit rate reduction encoding said edited audio signal to obtain a bit rate reduction encoded edited digital audio signal, said bit rate reduction encoded edited digital audio signal being time-division multiplexed with said additional information signal including said new editing number code, and wherein said recording step at said first apparatus records said new editing number code as is on said another recording medium.

38. A method according to claim 37, wherein each of said copy number code and said editing number code is separated into a code for video signal channel and a code for audio signal channel, and wherein each of said code for video signal channel and said code for audio signal channel is processed independently of the other.

* * * * *